United States Patent
Benson et al.

(10) Patent No.: US 6,557,530 B1
(45) Date of Patent: May 6, 2003

(54) FUEL CONTROL SYSTEM INCLUDING ADAPTIVE INJECTED FUEL QUANTITY ESTIMATION

(75) Inventors: Donald J. Benson, Columbus, IN (US); Taner Tuken, Columbus, IN (US); John T. Carroll, III, Columbus, IN (US)

(73) Assignee: Cummins, Inc., Columbus, IN (US)

(*) Notice: Subject to any disclaimer, the term of this patent is extended or adjusted under 35 U.S.C. 154(b) by 0 days.

(21) Appl. No.: 09/565,010

(22) Filed: May 4, 2000

(51) Int. Cl.$^7$ .............................................. F02M 51/00
(52) U.S. Cl. ........................ 123/480; 123/456; 123/447
(58) Field of Search ............................... 123/480, 456, 123/447, 446, 506, 479, 357; 73/119 A

(56) References Cited

U.S. PATENT DOCUMENTS

| | | | |
|---|---|---|---|
| 4,488,429 A | 12/1984 | Ito ............................ 73/119 A |
| 4,798,084 A | 1/1989 | Takahashi et al. ......... 73/119 A |
| 4,899,713 A | 2/1990 | Nakamura .................. 123/478 |
| 4,903,668 A | 2/1990 | Ohata ......................... 123/478 |
| 4,959,789 A | 9/1990 | Nakamura ............. 364/431.05 |
| 4,987,544 A | 1/1991 | Honda et al. .......... 364/431.05 |
| 5,020,362 A | 6/1991 | Hart et al. ................. 73/119 A |
| 5,068,794 A | 11/1991 | Hosaka ................... 364/431.05 |
| 5,080,076 A | 1/1992 | Eckert .......................... 123/506 |
| 5,150,690 A * | 9/1992 | Carter et al. ................. 123/527 |
| 5,676,116 A | 10/1997 | Tarr et al. ..................... 123/446 |
| 5,678,521 A | 10/1997 | Thompson et al. ......... 123/447 |
| 5,685,268 A * | 11/1997 | Wakemen ................ 123/198 D |
| 5,819,704 A | 10/1998 | Tarr et al. .................... 123/467 |
| 5,839,420 A | 11/1998 | Thomas ....................... 123/478 |
| 6,088,647 A * | 7/2000 | Hemberger et al. ......... 701/104 |
| 6,250,285 B1 * | 6/2001 | Takase ......................... 123/456 |

FOREIGN PATENT DOCUMENTS

| | | |
|---|---|---|
| DE | 197 26 100 A1 | 1/1998 |
| JP | S62-186034 | 8/1987 |
| JP | 2000-18064 | 1/2000 |

* cited by examiner

Primary Examiner—Henry C. Yuen
Assistant Examiner—Mahmoud Gimie
(74) Attorney, Agent, or Firm—Barnes & Thornburg

(57) ABSTRACT

A fuel control system for an internal combustion engine including injected fuel quantity estimation includes a fuel pump responsive to a fuel pump command to supply fuel to a fuel collection unit. A pressure sensor is provided for producing a pressure signal indicative of the pressure of fuel within the collection unit throughout a fuel injection event, and an engine position sensor is provided for producing an engine position signal indicative of a crank angle of the engine relative to a reference crank angle. A control circuit includes means responsive to the pressure signal and a desired fueling value for producing an initial fueling command, and further includes a fuel quantity estimation block responsive to the pressure signal, the engine position signal and a final fueling command to produce a fuel quantity estimation value. The final fueling command is computed by the control circuit as a function of the initial fueling command and the fuel quantity adjustment value to which the injector is responsive to supply fuel to the combustion chamber.

32 Claims, 20 Drawing Sheets

308

IF PE > PE THRESHOLD1 ; PE STATE = HIGH

IF PE < PE THRESHOLD2 ; PE STATE = LOW

IF PE THRESHOLD2 ≤ PE ≤ PE THRESHOLD1 ;
PE STATE = NORMAL

| CYL # | PE STATE | FE STATE | SE STATE | FAULT |
|---|---|---|---|---|
| 1 | LOW | HIGH | HIGH | OVERFUELING CYL #1 |
| 2 | NORMAL | NORMAL | NORMAL | |
| 3 | NORMAL | NORMAL | NORMAL | |
| ⋮ | ⋮ | ⋮ | ⋮ | ⋮ |
| 1 | NORMAL/LOW | HIGH | NORMAL | CONTINUOUSLY OVERFUELING CYL # 3 |
| 2 | NORMAL/LOW | HIGH | NORMAL | |
| 3 | NORMAL/LOW | HIGH | HIGH | |
| ⋮ | ⋮ | ⋮ | ⋮ | ⋮ |

FIG. 22 ns in only a single operating parameter. Control over variations in additional parameters would require prohibitively large and difficult to manage multi-dimensional look-up tables, wherein such tables would be limited to only operating parameters capable of compensation via look-up table techniques. For operating parameters that deteriorate or change with time, for example, compensation via look-up tables simply does not work without some type of scheme for updating such tables to reflect changes in those operating parameters.

FUEL CONTROL SYSTEM INCLUDING ADAPTIVE INJECTED FUEL QUANTITY ESTIMATION

FIELD OF THE INVENTION

The present invention relates generally to fuel injection systems for internal combustion engines, and more-specifically to techniques for estimating fuel injection quantities in such systems.

BACKGROUND OF THE INVENTION

In recent years, advances in fuel systems for internal combustion engines, and particularly for diesel engines, have increased dramatically. However, in order to achieve optimal engine performance at all operating conditions with respect to fuel economy, exhaust emissions, noise, transient response, and the like, further advances are necessary. As one example, operational accuracy with electronically controlled fuel systems can be improved by reducing variations in injected fuel quantities.

A number of techniques are known for reducing injected fuel quantity variations such as, for example, robust system design, precision manufacturing, precise component matching, and electronic control strategies. However, conventional manufacturing approaches for improving performance, such as tightening tolerances and the like, are typically cost prohibitive, and conventional control approaches such as open-loop look-up tables have become increasingly complex and difficult to implement as the number of degrees of freedom to control have increased, particularly with multiple-input, multiple-output (MIMO) control systems. In fact, both of these approaches improve accuracy only during engine operation immediately after calibration in a controlled environment, and neither compensate for deterioration or environmental noise changes which affect subsequent performance. Closed-loop control systems for controlling injected fuel quantity variations are accordingly preferable, but typically require additional sensors to measure appropriate control parameters.

One known technique for implementing such a closed-loop control system without implementing additional sensors is to leverage existing information to estimate injected fuel quantity; i.e., implementation of a so-called "virtual sensor." One example of a known control system 10 including such a virtual sensor is illustrated in FIG. 3. Referring to FIG. 3, system 10 includes a two-dimensional look-up table 14 receiving an engine speed/position signal via signal line 12 and a desired fuel injection quantity value from process block 16 via signal path 18. Table 14 is responsive to the engine speed/position signal and the desired fuel injection quantity value to produce an initial fueling command as is known in the art. The virtual injected fuel quantity sensor in system 10 typically comprises a two-dimensional look-up table 20 receiving the engine speed/position signal via signal path 12 and a fuel pressure signal from signal path 22. Table 20 is responsive to the fuel pressure and engine speed/position signals to produce an injected fuel quantity estimate that is applied to summing node 24. Node 24 produces an error value as a difference between the desired fuel injection quantity and the injected fuel quantity estimate and applies this error value to a controller 26. Controller 26 is responsive to the error value to determine a fuel command adjustment value, wherein the initial fueling command and the fuel command adjustment value are applied to a second summing node 28. The output of summing node 28 is the output 30 of system 10 and represents a final fueling command that is the initial fueling command produced by table 14 adjusted by the fuel command adjustment value produced by controller 26.

While system 10 of FIG. 3 provides for a closed-loop fuel control system utilizing a virtual sensor to achieve at least some control over variations in injected fuel quantities, it has a number of drawbacks associated therewith. For example, a primary drawback is that prior art systems of the type illustrated in FIG. 3 are operable to compensate for variations in only a single operating parameter. Control over variations in additional parameters would require prohibitively large and difficult to manage multi-dimensional look-up tables, wherein such tables would be limited to only operating parameters capable of compensation via look-up table techniques. For operating parameters that deteriorate or change with time, for example, compensation via look-up tables simply does not work without some type of scheme for updating such tables to reflect changes in those operating parameters.

As another drawback of prior art systems of the type illustrated in FIG. 3, such systems are not closed-loop with respect to injector-to-injector fueling variations. For example, referring to FIG. 16, a plot 35 of measured fuel injection quantity vs. injector actuator commanded on-time (i.e., desired fueling command) for each injector (cylinder) of a six-cylinder engine, is shown wherein the between-cylinder fueling variations are the result of various mismatches in the fueling system hardware. As is apparent from plot 35, the between-cylinder fuel injection quantity variations are quite pronounced and generally unacceptable in terms of accurate fueling control. While known cylinder balancing techniques could reduce such cylinder-to-cylinder fueling variations, the fuel control system of FIG. 3 would be ineffective in reducing such variations. Moreover, the fuel control system of FIG. 3 would further be ineffective in reducing engine-to-engine fueling variations. Referring to FIG. 17, for example, plots of average injected fuel vs. injector on-time for three engine fueling extremes are illustrated. Nominal engine fueling requirements are illustrated by curve 36, minimum engine fueling conditions are illustrated by curve 38 and maximum engine fueling conditions are illustrated by curve 40. While engines of the same type may be designed for identical fueling requirements, their actual fueling requirements may fall anywhere between curves 38 and 40. Unfortunately, the prior art fuel control system of FIG. 3 cannot compensate for such engine-to-engine fueling variations. In general, if such control parameter variations are not attributable to the operating parameter for which the system is designed to compensate for, but are instead attributable to other error sources for which the control system of FIG. 3 is not designed to compensate for, the system performance may actually be worse than would otherwise be the case with conventional fuel control techniques.

By the nature of their uses in a wide variety of applications, engines are typically required over their operating lifetimes to work in environments wherein many internal and external parameters that affect engine performance may vary, cannot be controlled and/or cannot be, or typically are not, measured. Heretofore, known control systems have attempted to improve injected fueling accuracy using a parameter that is both measurable and controllable. Such systems typically operate by making control changes, based on an estimated sensitivity in the fueling quantity, to this measurable and controllable parameter using assumed values for other internal and/or external parameters rather than taking into account performance effects and interactions of these other parameters. By contrast, if the injected fueling quantity can be estimated utilizing a sensor or virtual sensor that is independent of many of the internal and external parameters that affect the engine's injected fueling quantity, a robust closed-loop fueling quantity control can be performed directly on the estimated fuel quantity rather than on only one of the control parameters that affect the fueling quantity. What is therefore needed is an improved strategy for adaptively estimating injected fuel quantities based on real-time performance of certain fuel system operating conditions throughout an injection event to thereby allow for robust and accurate operation as well as straightforward integration into complex fuel control systems. Ideally, such a strategy should be capable of minimizing between-cylinder and between-engine fueling variations.

SUMMARY OF THE INVENTION

The foregoing shortcomings of the prior art are addressed by the present invention. In accordance with one aspect of the present invention, a fuel control system for an internal combustion engine comprises means for storing pressurized fuel, means for injecting a quantity of fuel from the means for storing pressurized fuel into a combustion chamber of an internal combustion engine, means for determining a first energy level associated with the means for storing pressurized fuel prior to injection of the quantity of fuel and a second energy level associated with the means for storing pressurized fuel after injection of the quantity of fuel, and means for determining an estimate of the quantity of fuel as a function of a difference between the first and second energy levels.

In accordance with another aspect of the present invention, a fuel control system for an internal combustion engine comprises a collection unit for receiving pressurized fuel, a fuel injector responsive to a fueling command to dispense a quantity of fuel into a combustion chamber of an internal combustion engine, a pressure sensor operable to sense pressure of the pressurized fuel within the collection unit and produce a pressure signal corresponding thereto, and a control computer responsive to the pressure signal to determine a change in fuel pressure value as a function of the pressure signal prior to injection of the quantity of fuel and of the pressure signal after injection of the quantity of fuel. The control computer is operable to determine an estimate of the quantity of fuel as a function of the change in the fuel pressure value.

In accordance with yet another aspect of the present invention, a fuel control system for an internal combustion engine comprises a collection unit for receiving pressurized fuel, a fuel injector responsive to a fueling command to dispense a quantity of the pressurized fuel during an injection event, means for sensing pressure of the pressurized fuel and producing a pressure signal corresponding thereto, and a control circuit responsive to the pressure signal to determine a discharged fuel estimate as a function of a fuel pressure change across the injection event. The control circuit is also responsive to the pressure signal to determine a control flow estimate as a function of an injection pressure during said injection event, and to determine an estimate of the quantity of fuel as a function of the discharged fuel estimate and the control flow estimate.

In accordance with still another aspect of the present invention, a method of controlling a fuel system of an internal combustion engine comprises the steps of providing a supply of pressurized fuel, dispensing a quantity of the pressurized fuel pursuant to an injection event, determining a change in pressure of the supply of pressurized fuel across the injection event, and determining an estimate of the quantity of the pressurized fuel as a function of the change in pressure of the supply of pressurized fuel.

In accordance with a further aspect of the present invention, a fuel control system for an internal combustion engine comprises a collection unit for receiving pressurized fuel, a number of fuel injectors each responsive to a separate fueling command to dispense a quantity of the pressurized fuel into one of a corresponding number of combustion chambers of an internal combustion engine, a pressure sensor operable to sense pressure of the pressurized fuel within the collection unit and produce a pressure signal corresponding thereto, an engine speed sensor operable to sense engine speed and produce an engine speed signal corresponding thereto, and means for determining a pressure error for each of the number of combustion chambers as a function of a desired fuel injection pressure and the pressure signal while dispensing the quantity of the pressurized fuel therein, means for measuring the quantity of the pressurized fuel dispensed in each of the number of combustion chambers and producing a corresponding number of measured fuel quantity values, means for determining a fuel quantity error for each of the number of combustion chambers as a function of a corresponding one of the measured fuel quantity values and an associated desired fuel quantity value, means for determining a speed error for each of the number of combustion chambers as a function of the engine speed signal over one engine cycle and the engine speed signal over one firing cycle associated with a corresponding one of the combustion chambers, and means for comparing the pressure errors, the fuel quantity errors and the speed errors for predefined combustion chamber combinations with a fault tree matrix and logging fault codes indicated thereby within a memory unit. In accordance with still a further aspect of the present invention, a method of controlling a fuel system, comprising the steps of providing a supply of pressurized fuel, dispensing a quantity of the pressurized fuel within each of a number of combustion chambers of an internal combustion engine pursuant to an associated injection event, determining a pressure error for each of the number of combustion chambers as a function of a pressure of the pressurized fuel during the associated injection event and a desired fuel pressure value corresponding thereto, measuring the quantity of pressurized fuel dispensed within each of the combustion chambers and producing a corresponding number of measured fuel quantity values, determining a fuel quantity error for each of the number of combustion chambers as a function of a corresponding one of the number of measured fuel quantity values and an associated desired fuel quantity value, determining an engine speed error for each of the number of combustion chambers as a function of engine speed over at least one engine cycle and engine speed over a firing cycle associated with a corresponding combustion chamber, and comparing the pressure, fuel quantity and engine speed errors for predefined combinations of combustion cylinders with a fault tree matrix and logging faults indicated thereby within a memory unit.

In accordance with yet another aspect of the present invention, a method of determining bulk modulus information of pressurized fuel in a fuel system of an internal combustion engine comprising the steps of providing a supply of pressurized fuel, determining a rate of change of pressure associated with the supply of pressurized fuel over a fuel pressure range, and producing an instantaneous bulk modulus value of the pressurized fuel as a function of the rate of change of pressure.

In accordance with yet a further aspect of the present invention, a method of determining bulk modulus information of pressurized fuel in a fuel system of an internal combustion engine comprises the steps of providing a supply of pressurized fuel, determining a slope of a rate of change of fuel pressure associated with the supply of pressurized fuel, determining an intercept value of the rate of change of fuel pressure at a predefined pressure value, producing a bulk modulus slope value as a function of the slope of the rate of change of pressure, and producing a bulk modulus intercept value as a function of the intercept value.

One object of the present invention is to provide an improved fuel control system utilizing adaptive closed-loop feedback techniques for accurately estimating injected fuel quantities without adding further sensors.

Another object of the present invention is to provide such a system wherein injected fuel quantities are estimated as a function of a change in energy of a fuel collection unit operable to supply pressurized fuel to a number of fuel injectors.

Yet another object of the present invention is to provide such a system wherein the change in energy of the fuel collection unit is determined as a change in pressures of the fuel collection unit at least prior to and after an injection event.

Still another object of the present invention is to provide such a system including provisions for estimating a bulk modulus of the fuel within the collection unit and adjusting the injected fuel quantity estimates in accordance therewith.

A further object of the present invention is to provide such a system wherein the fuel quantity estimates are adjusted in accordance with corresponding estimates of one or more control flow events.

Still a further object of the present invention is to provide such a system wherein the fuel quantity estimates are adjusted in accordance with corresponding estimates of parasitic leakage estimates.

Yet a further object of the present invention is to provide a fuel control system operable to measure or estimate injected fuel quantities wherein error values between desired fuel and measured or estimated injected fuel, between desired fuel pressure and measured fuel pressure during injection, and between average engine speed over an engine cycle and engine speed over an injection event are generated and compared with a fault tree matrix to determine and log appropriate fuel system failures.

These and other objects of the present invention will become more apparent from the following description of the preferred embodiments.

BRIEF DESCRIPTION OF THE DRAWINGS

FIG. 21 is a diagrammatic illustration of one embodiment of step 308 of the algorithm of FIG. 20, in accordance with the present invention.

FIG. 22 is a diagrammatic illustration of one embodiment of step 310 of the algorithm of FIG. 20, in accordance with the present invention.

DESCRIPTION OF THE PREFERRED EMBODIMENTS

Figure 1A:
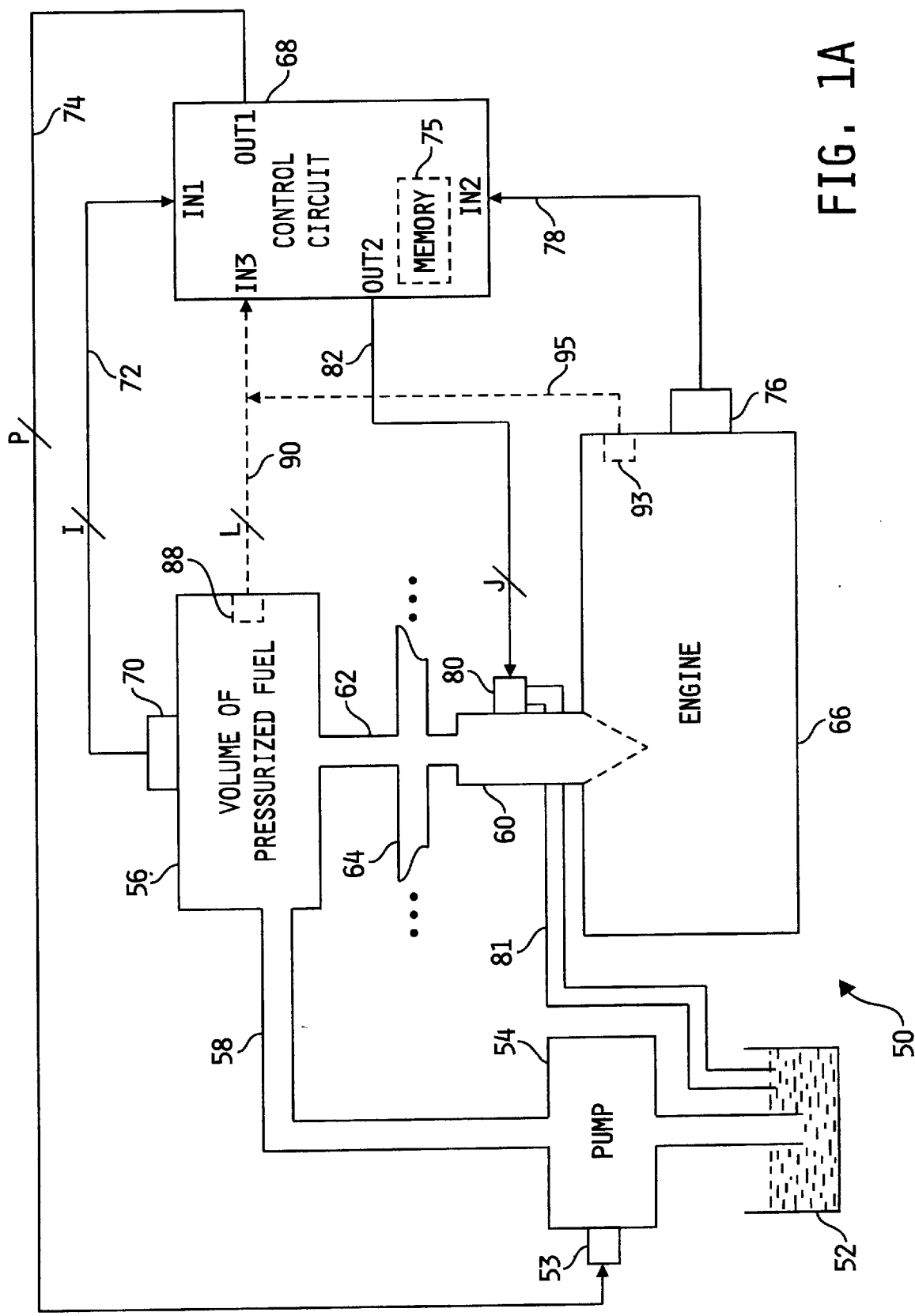
FIG. 1A is a diagrammatic illustration of one embodiment of a system for controlling fuel injection to an internal combustion engine, in accordance with the present invention.

For the purposes of promoting an understanding of the principles of the invention, reference will now be made to preferred embodiments thereof illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1A, one preferred embodiment of an electronic fuel control system 50, in accordance with the present invention, is shown. Fuel control system 50 includes a source of fuel 52; e.g. diesel engine fuel, having an inlet port of a fuel pump 54 in fluid communication therewith. In one embodiment, fuel pump 54 is a high pressure pump configured to supply high pressure fuel from fuel supply 52, which may typically be a low pressure fuel supply pump operable to supply low pressure fuel from a fuel source to fuel pump 54, to at least one outlet port thereof in a cyclic fashion. It is to be understood, however, that the present invention contemplates that pump 54 may alternatively be configured to supply pressurized fuel in a non-cyclic fashion. In any case, in the system 50 of FIG. 1A, pump 54 is configured to supply pressurized fuel to a fuel collection unit 56 via supply passage 58. Fuel collection unit 56 is fluidly connected to a fuel injector 60 via supply passage 62, and fuel injector 60 is configured to be mounted to an internal combustion engine 66 in fluid communication with a combustion chamber thereof as is known in the art. Fuel collection unit 56 may optionally be fluidly coupled to additional fuel injectors via supply passage 64. In the embodiment shown in FIG. 1A, the fuel collection unit 56 is conventionally referred to as a fuel accumulator or fuel storage unit.

Central to the electronic control of pump 54 and injector 60 is a control circuit 68 having a memory unit 75 associated therewith. In one embodiment, control circuit 68 is a control computer of known construction, wherein such a circuit 68 is typically referred to by those skilled in the art as an electronic (or engine) control module (ECM), engine control unit (ECU) or the like, although the present invention contemplates that control circuit 68 may alternatively be any circuit capable of performing the functions described hereinafter with respect to circuit 68. In any case, control circuit 68 is operable, at least in part, to control the fueling of engine 66 in accordance with one or more software algorithms stored within memory unit 75.

System 50 includes a number of sensors and/or sensor subsystems for providing control circuit 68 with operational information relating to some of the components of system 50 as well as certain engine operating information. For example, fuel collection unit 56 includes a pressure sensor 70 electrically connected to an input IN1 of control circuit 68 via a number, I, of signal paths 72, wherein I may be any positive integer. Sensor 70 is preferably a known sensor operable to sense the pressure of the volume of pressurized fuel within collection unit 56 and provide a fuel pressure signal corresponding thereto to input IN1 of control circuit 68 via signal paths 72, as is known in the art. System 50 further includes an engine speed/position sensor 76 electrically connected to an input IN2 of control circuit 68 via signal path 78. In one embodiment, sensor 76 is a known engine speed/position sensor including a Hall effect sensor disposed proximate to a toothed gear or wheel rotating synchronously with the crankshaft of the engine (not shown). Preferably, the toothed gear or wheel includes a number of equi-angularly spaced teeth as well as an extra tooth disposed between adjacent ones of the equi-angularly spaced teeth. Sensor 76 is operable to produce an engine speed/position signal including information relating to the rotational speed of the engine crank shaft (not shown) based on the passage thereby of the equi-angularly spaced teeth, as well as information relating to engine position relative to a reference engine position (e.g., angle of the crank shaft (crank angle) relative to a top-dead-center (TDC) position of the engine cylinder in question) based on passage thereby of the extra tooth. Alternatively, system 50 may substitute the sensor 76 just described with one or more known sensors producing equivalent information in the form of one or more electrical signals.

System 50 optionally includes an engine temperature sensor operable to sense the operating temperature of engine 66 and provide a corresponding engine temperature signal to an input IN3 of control circuit 68 via a number, L, of signal paths 90, wherein L may be any positive integer. In one embodiment, the engine temperature sensor is a known fuel temperature sensor 88, as shown in phantom in FIG. 1A, wherein sensor 88 is suitably located (e.g., within fuel collection unit 56) so as to provide a signal to input IN3 of control circuit 68 indicative of the temperature of the pressurized fuel supplied by pump 54. Alternatively, the engine temperature sensor may be a known coolant fluid sensor 93 as shown in phantom in FIG. 1A, wherein sensor 93 is suitably located so as to provide a signal to input IN3 of control circuit 68 via signal path 95 that is indicative of the temperature of engine coolant fluid. Those skilled in the art will recognize that other known sensors or sensor subsystems may be used in place of sensor 88 or sensor 93, wherein any such sensor or sensor subsystem is operable to produce one or more signals from which engine operating temperature may be determined or estimated, and that any such sensor or sensor subsystem for determining or estimating engine operating temperature is intended to fall within the scope of the present invention.

Control circuit 68 includes a number of outputs by which certain components of system 50 may be electronically controlled. For example, output OUT1 of control circuit 68 is electrically connected to an actuator 53 of fuel pump 54 via a number, P, of signal paths 74, wherein P may be any positive integer and wherein actuator 53 may be a solenoid or other known actuator. In any case, actuator 53 of pump 54 is responsive to a pump command signal produced by control circuit 68 on signal path 74 to cause the pump 54 to supply fuel from fuel supply 52 to fuel collection unit 56. Output OUT2 of control circuit 68 is electrically connected to an actuator 80 (e.g., solenoid) of fuel injector 60 via a number, J, of signal paths 82, wherein J may be any positive integer, whereby actuator 80 is responsive to a fuel command signal produced by control circuit 68 on signal path 82 to actuate injector 60 to thereby dispense a quantity of fuel from fuel collection unit 56 into a combustion chamber of engine 66. Additionally, actuator 80 is operable to direct unused (non-injected) fuel supplied thereto to fuel source 52 via fuel passageway 81, as is known in the art.

It is to be understood that in the embodiment illustrated in FIG. 1A, system 50 may include any number of fuel pumps 54, fuel collection units 56, fuel injectors 60 and associated passageways as indicated by the integer designations of signal paths 72, 74, 80 and 90. As one specific example, system 50 configured for a 6 cylinder engine may include a pair of fuel pumps 54, a pair of fuel collection units 56 and six fuel injectors 60 wherein one fuel pump 54 and associated fuel collection unit 56 is operable to supply pressurized fuel to a first bank of three fuel injectors (e.g., front bank) and the other fuel pump 54 and associated fuel collection unit 56 is operable to supply pressurized fuel to a second bank of three fuel injectors (e.g., rear bank). Those skilled in the art will recognize other combinations of fuel pump 54, fuel collection unit 56, fuel injector 60 and associated passageways, and that other such combinations are intended to fall within the scope of the present invention.

Figure 1B:
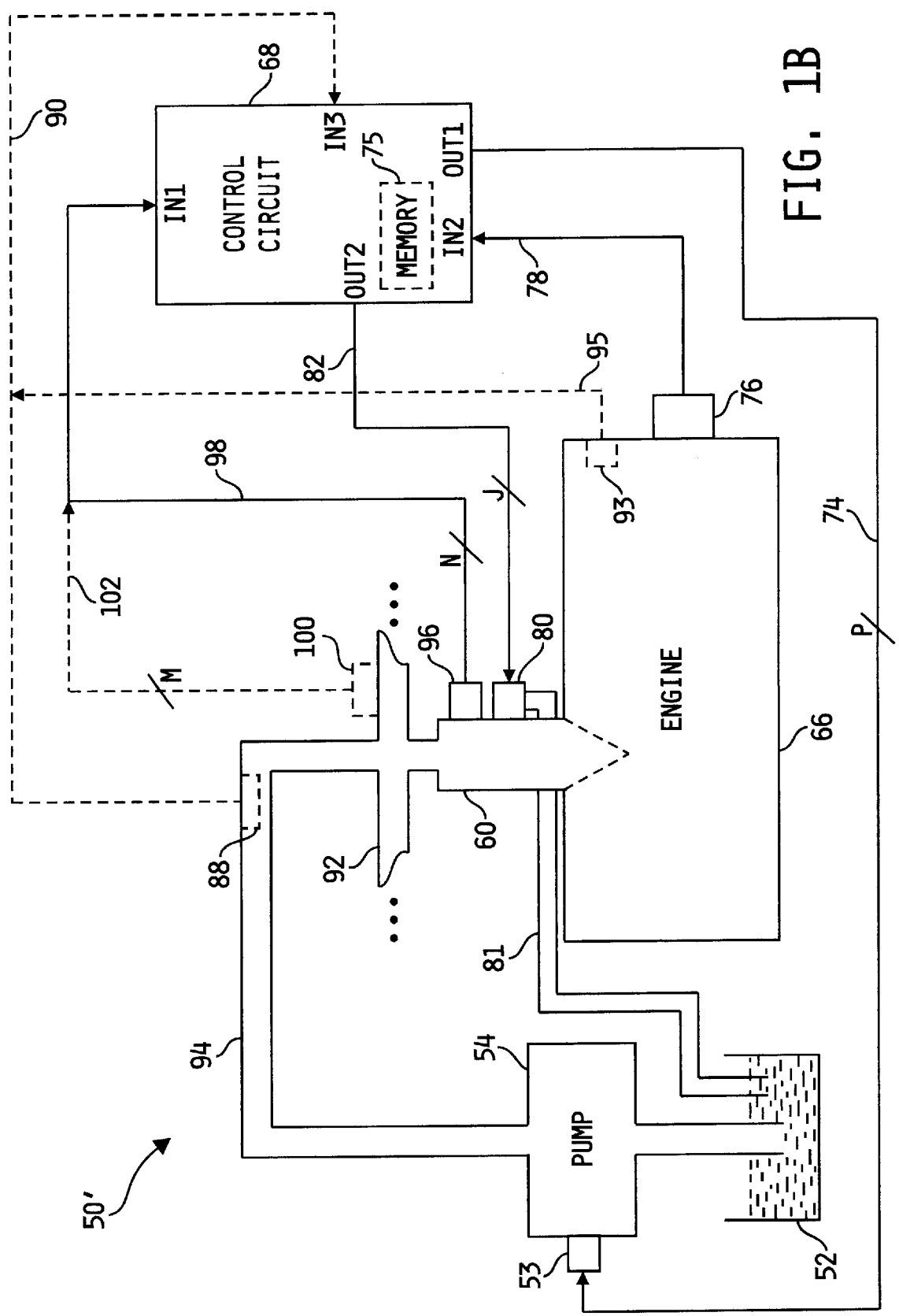
FIG. 1B is a diagrammatic illustration of an alternate embodiment of a system for controlling fuel injection to an internal combustion engine, in accordance with the present invention.

Referring now to FIG. 1B, an alternative embodiment of an electronic fuel control system 50', in accordance with the present invention, is shown. System 50' is identical in many respects to system 50 of FIG. 1A, and like reference numbers are therefore used to identify like components. System 50' of FIG. 1B differs from system 50 of FIG. 1A in that fuel pump 54 is fluidly connected directly to a so-called fuel "rail" 92 via supply passage 94, wherein the fuel rail 92 is fluidly connected to injector 60 and optionally to a number of additional fuel injectors. In one embodiment of the fuel control system 50' illustrated in FIG. 1B, the "fuel collection unit", as this term is used hereinabove, is comprised of the fuel rail 92, whereby a pressure sensor 100 suitably located relative to rail 92 is electrically connected to input IN1 of control circuit 68 via a number, M, of signals path 102 as shown in phantom in FIG. 1B. In this embodiment, pressure sensor 100 is operable to sense the pressure of fuel within fuel rail 92 and provide a corresponding number, M, of fuel pressure signals corresponding thereto, wherein M may be any positive integer. In an alternative embodiment of the fuel control system 50' of FIG. 1B, the "fuel collection unit" is comprised of the fuel storage portion of fuel injector 60, whereby a pressure sensor 96 suitable located relative to injector 60 is electrically connected to input IN1 of control circuit 68 via a number, N, of signal paths 98 as shown in phantom in FIG. 1B. In this embodiment, pressure sensor 96 is operable to sense the pressure of fuel within injector 60 and provide a corresponding number, N, of fuel pressure signals corresponding thereto, wherein N may be any positive integer. It is to be understood that in either embodiment of the fuel control system 50' of FIG. 1B, any number of fuel pumps 54, fuel injectors 60 and fuel rails 94 may be provided and fluidly connected to any desired combinations or groupings of fuel injectors 60, as described with respect to FIG. 1A, to thereby accommodate any desired fuel pump/fuel rail/injector combinations or groupings. In any case, it should now be readily apparent that the term "fuel collection unit", as it relates to the present invention, may be understood to identify any of an accumulator-type storage unit, such as unit 56 of FIG. 1A, a fuel rail-type storage unit, such as fuel rail 94, or a fuel injector type storage unit, such as the fuel storage portion of injector 60, and that the term "fuel storage pressure" refers to the pressure of fuel stored within any of the foregoing fuel collection units.

Figure 2:
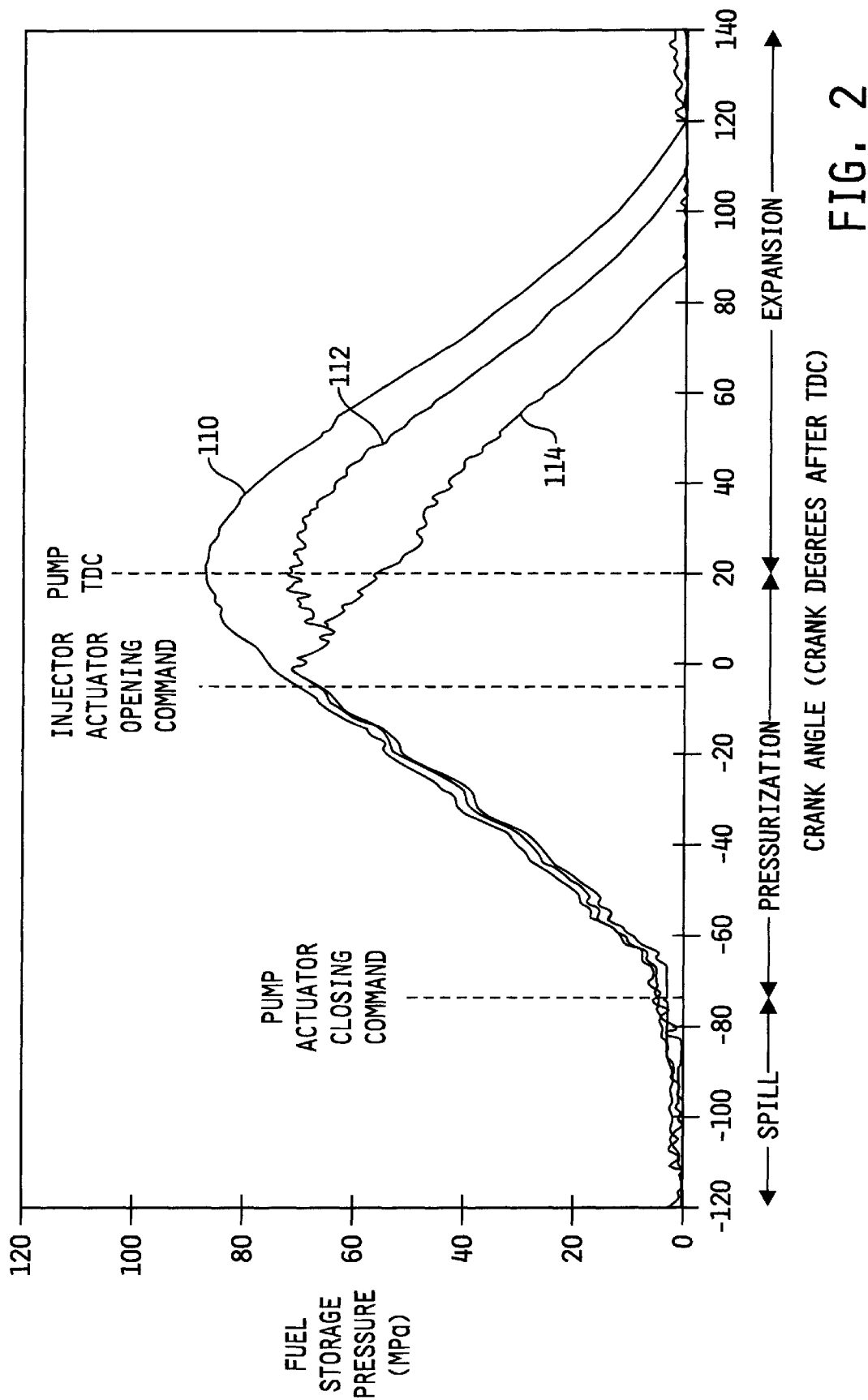
FIG. 2 is a plot of fuel storage pressure vs. crank angle for different fuel injection quantities.

Referring now to FIG. 2, some of the basic principles of the present invention will now be described. FIG. 2 shows a plot of fuel storage pressure vs. crank angle, wherein the illustrated fuel storage pressure curves 110, 112 and 114 correspond to signals provided by any of the fuel pressure sensors 70, 96 or 100 (FIGS. 1A and 1B) and are thus representative of fuel pressures within the "fuel collection unit" as this term is defined hereinabove. The fuel storage pressure curves 110, 112, 114 are plotted against crank angle throughout the conventional spill, pressurization and expansion phases of fuel injection (i.e., a fuel injection event), wherein pump actuator opening command (i.e., control signal to the pump actuator 53 on signal path 74), injector actuator closing command (i.e., control signal to the injector actuator 80) and pump TDC (i.e., top dead center position of fuel pump 54 relative to a reference pump position) indicators are included for reference. The fuel pump 54 spills low pressure fuel until control circuit 68 produces a pump command on signal path 74 instructing the fuel pump actuator 53 to close. The earlier in the cycle that the pump actuator 53 is closed, the higher the generated pressure will be in the fuel collection unit. After the actuator 53 is closed, the pump starts to increase the fuel pressure in the collection unit until the pump plunger (not shown) retracts during the expansion phase of the cycle. A fuel injection event can be positioned either during the pressurization phase, expansion phase or both, and is controlled by the injector's control actuator 80. In FIG. 2, fuel storage pressure curve 110 corresponds to fuel storage pressure when no fuel injection occurs, fuel storage pressure curve 112 corresponds to fuel storage pressure when a medium quantity of fuel is injected and fuel storage pressure curve 114 corresponds to fuel storage pressure when a large quantity of fuel is injected.

In accordance with the present invention, estimation of injected fuel quantities for fuel systems which store pressurized fuel is based on the principle that the quantity of fuel removed from the fuel collection unit (i.e., fuel storage device) is reflected in the magnitude of the change in energy of the fuel collection unit across a fuel injection event. In the embodiments of system 50 and 50' of FIGS. 1A and 1B respectively, this change in energy of the fuel collection unit across a fuel injection event is measured as a change in fuel pressure by monitoring any of the fuel pressure sensors 70, 96 and 100. However, those skilled in the art will recognize that other known mechanisms may be used to measure the change in energy of the fuel collection unit across a fuel injection event, and that such other mechanisms are intended to fall within the scope of the present invention. Examples of such other known mechanisms may include, but are not limited to, known devices for determining changes in fuel mass, fuel volume or strain of the fuel collection unit across a fuel injection event. In any case, the governing principle of the injected fuel quantity estimation technique of the present invention is based on a change in the amount of energy stored in the fuel collection unit across an injection event being equal to the net energy received from the fuel pump 54 minus the energy removed from the fuel collection unit pursuant to a fuel injection event minus any energy losses. For purposes of the description of the present invention hereinafter, the change in fuel collection unit energy across an injection event will be limited to changes in fuel pressure of the fuel collection unit, it being understood that other known mechanisms, such as those listed above, for example, may alternatively be used to measure changes in fuel collection unit energy across a fuel injection event.

Figure 4:
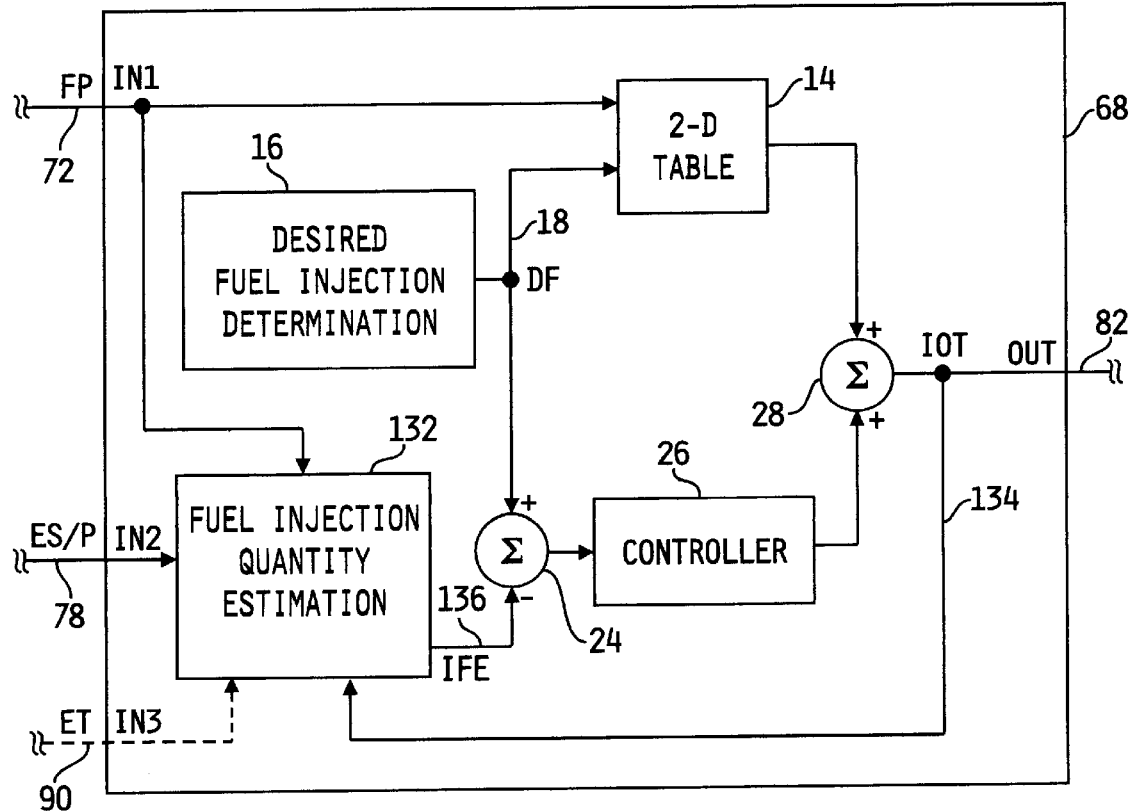
FIG. 4 is a diagrammatic illustration of one embodiment of an improved closed-loop fuel injection control strategy including a fuel injection quantity estimation technique, in accordance with the present invention.

Referring now to FIG. 4, some of the internal features of control circuit. 68, as they relate to fuel system control in accordance with the present invention, are shown. It is to be understood that not all such internal features are intended to represent physical structures within control circuit 68, but are rather intended to represent a control strategy that may be executed by control circuit 68 via one or more software algorithms stored in memory 75 of control circuit 68.

Figure 3:
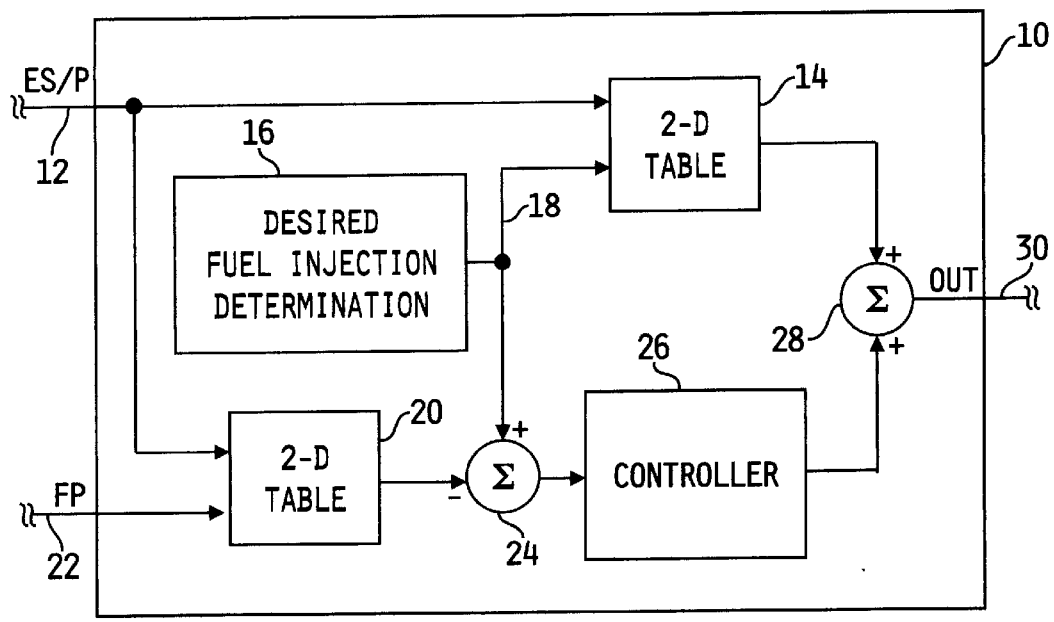
FIG. 3 is a diagrammatic illustration of a prior art closed-loop fuel injection control strategy including a known open-loop fuel quantity estimation technique, for a known fuel injection system.

The internal features of control circuit 68 shown in FIG. 4 are similar in many respects to the internal features of the prior art control circuit 10 of FIG. 3, and like features are accordingly identified with like reference numbers. An exception includes replacing the 2-dimensional look up table 20 of FIG. 3 with a fuel injection quantity estimation block 132 in FIG. 4, wherein block 132 is configured to receive a fuel pressure signal (FP) via signal path 72, an engine speed/position signal (ES/P) via signal path 78 and a commanded fuel signal (in terms of an injector on-time signal produced by control circuit 68 on signal path 82) via signal path 134. Optionally, as will be described in greater detail hereinafter, fuel injection quantity estimation block 132 may additionally receive an engine temperature signal via signal path 90. An injected fuel estimate (IFE) value is produced by fuel injection quantity estimation block 132 and is directed to a subtractive input of summing node 24 via signal path 136. In accordance with the present invention, the fuel injection quantity estimation block 132 thus serves as a virtual sensor operable to estimate injected fuel quantities.

In the operation of the portion of control circuit 68 illustrated in FIG. 4, two-dimensional look-up table 14 receives a fuel pressure signal (FP) via signal line 72 and a desired fuel injection quantity value (DF) from process block 16 via signal path 18. Table 14 is responsive to the fuel pressure signal and the desired fuel injection quantity value to produce an initial fueling command as is known in the art. The fuel injection estimation block 132 is responsive to at least the fuel pressure signal on signal path 72, the engine speed/position signal (ES/P) on signal path 78 and a final fueling command (injector on-time signal (IOT)) on signal path 134 to estimate an injected fuel quantity and supply a corresponding injected fuel quantity estimate (IFE) to a subtractive input of summing node 24 via signal path 136. Node 24 produces an error value as a difference between the desired fuel injection quantity (DF) and the injected fuel quantity estimate (IFE) and applies this error value to a controller 26. Controller 26 is responsive to the error value to determine a fuel command adjustment value, wherein the initial fueling command and the fuel command adjustment value are applied to additive inputs of a second summing node 28. The output of summing node 28 is the output 82 of control circuit 68 and represents a final fueling command that is the initial fueling command produced by table 14 adjusted by the fuel command adjustment value produced by controller 26.

Figure 5:
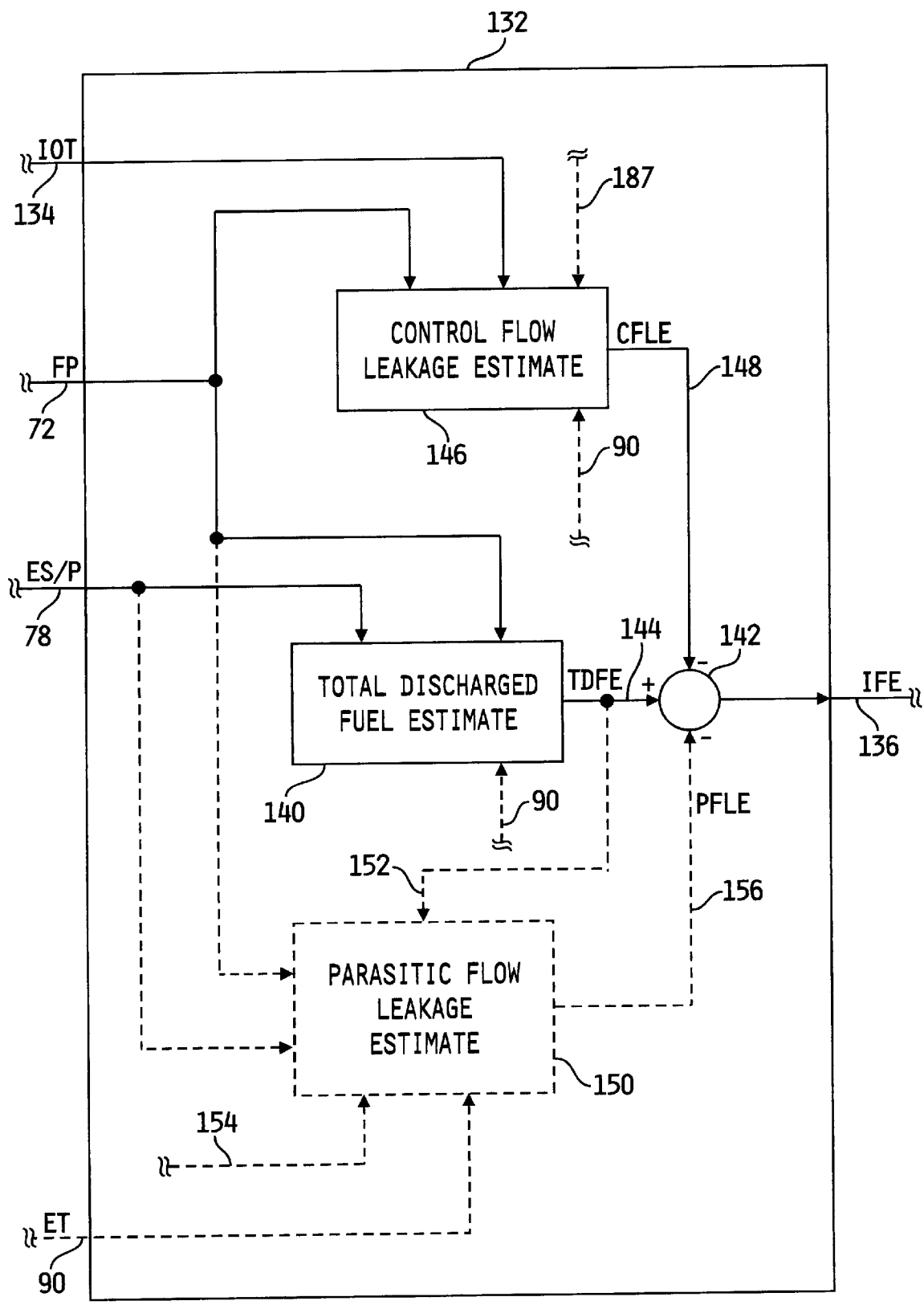
FIG. 5 is a diagrammatic illustration of one embodiment of the fuel injection quantity estimation block of FIG. 4, in accordance with the present invention.

Referring now to FIG. 5, one preferred embodiment of the fuel injection quantity estimation block 132 of FIG. 4 is shown. Block 132 includes a total discharged fuel estimate block 140 receiving the fuel pressure signal (FP) via signal path 72 and the engine speed/position (ES/P) signal via signal path 78. Optionally, block 140 may be configure to receive the engine temperature (or fuel temperature) signal (ET) via signal path 90, as shown in phantom in FIG. 5. Block 140 is operable, as will be. more fully described hereinafter, to process the fuel pressure and engine speed/position signals (and optionally the engine/fuel temperature signal ET) and produce a total discharged fuel estimate value (TDFE) on signal path 144 corresponding to an amount of pressurized fuel removed from the fuel collection unit 56 pursuant to a fuel injection event.

Fuel injector control actuator 80 of fuel injector 60 is controlled by control circuit 68 to direct or spill at least some of the pressurized fuel supplied by fuel collection unit 56 to fuel injector 60 back to fuel supply 52 via a hydraulic path or fuel passageway 81 in order to cause an actual fuel injection event to occur, as is known in the art. In such cases, the fuel injection quantity estimation block 132 of the present invention accordingly includes a control flow leakage estimate block 146 operable to estimate such a fuel spill amount, as will be described more fully hereinafter, so that the fuel spill amount can be subtracted from the total discharged fuel estimate value (TDF) in determining the injected fuel estimate (IFE). The fuel pressure signal (FP) on signal path 72 and the final fueling command (in terms of injector on-time IOT) on signal path 134 are provided to the control flow leakage estimate block 146. Optionally, as shown in phantom in FIG. 5, the engine temperature (or fuel temperature) signal ET may be provided to block 146 via signal path 90. In any case, the control flow leakage estimate block 146 is operable to process these signals and produce a control flow leakage estimate value (CFLE) on signal path 148. Optionally, as shown in phantom in FIG. 5, one or more additional signals may be supplied to block 146 via signal path 187, wherein block 146 is operable to process such signals along with the IOT and FP signals to produce the control flow leakage estimate (CFLE). Examples of signals available on signal path 187 include, but are not limited to, engine speed/position, engine timing, and the like. In any case, signal path 144 is supplied to an additive input of a summing node 142, and signal path 148 is supplied to a subtractive input of summing node 142. An output of summing node 142 forms the output 136 of the fuel injection quantity estimation block 132 and accordingly carries the injected fuel estimate value (IFE).

Those skilled in the art will recognize that the control flow leakage estimate block 146 is necessarily included in fuel systems having so-called indirect control (e.g., injectors defining a hydraulic link between the injector inlet port and outlet drain) over fuel injector delivery time or "on-time" as this term is used herein. Conversely, it should also be recognized that fuel systems are known that include structure providing for direct control over fuel injector delivery time or on-time. In these types of fuel systems, spill valves of the type just described are therefore unnecessary and no control flow exists to create an actual injection event. In such systems, the control flow leakage estimate block 146 can therefore be omitted.

Optionally, as shown in phantom in FIG. 5, the fuel injection quantity estimation block 132 may include a parasitic flow leakage estimate block 150 receiving the fuel pressure signal (FP) and engine speed/position signal (ES/P) via signal paths 72 and 78, respectively. Additionally, block 150 receives an engine temperature signal (ET) via signal path 90 and the total discharged fuel estimate value TDFE on signal path 144 via signal path 152. Finally, block 150 may be configured to receive one or more additional signals via signal path 154 as will be more fully described hereinafter. The parasitic flow leakage estimate block 150 is operable to process the foregoing information and produce a parasitic flow leakage estimate (PFLE) on signal path 156 which is supplied to a subtractive input of summing node 142. The injected fuel estimate (IFE) of block 132 is, in this case, is the total discharged fuel estimate (TDFE) minus the control flow leakage estimate (CFLE) and the parasitic flow leakage estimate (PFLE).

In some fueling systems, the parasitic leakage on the injected fuel and quantity estimate (IFE) may be negligible. In other systems, non-negligible parasitic leakage levels may be minimized by reading pre- and post-injection fuel pressure values very close to the injection event itself. In any such fuel system embodiments wherein such parasitic leakage may be negligible, the parasitic flow leakage estimate block 150 may be omitted from the fuel injection quantity estimation block 132, with the injected fuel estimate (IFE) then being computed as a difference between the total discharged fuel estimate (TDFE) and the control flow leakage estimate (CFLE) in fuel systems having a control flow of fuel as described above, or simply as the total discharged fuel estimate (TDFE) in fuel systems having no control flow. In other fuel systems, the parasitic flow leakage estimate (PFLE) may contribute significantly to the injected fuel estimate (IFE), in which case the parasitic flow leakage estimate block 150 should be included for accuracy. In any case, preferred embodiments and operation of the parasitic flow leakage estimate block 150 will be more fully described hereinafter.

Figure 6:
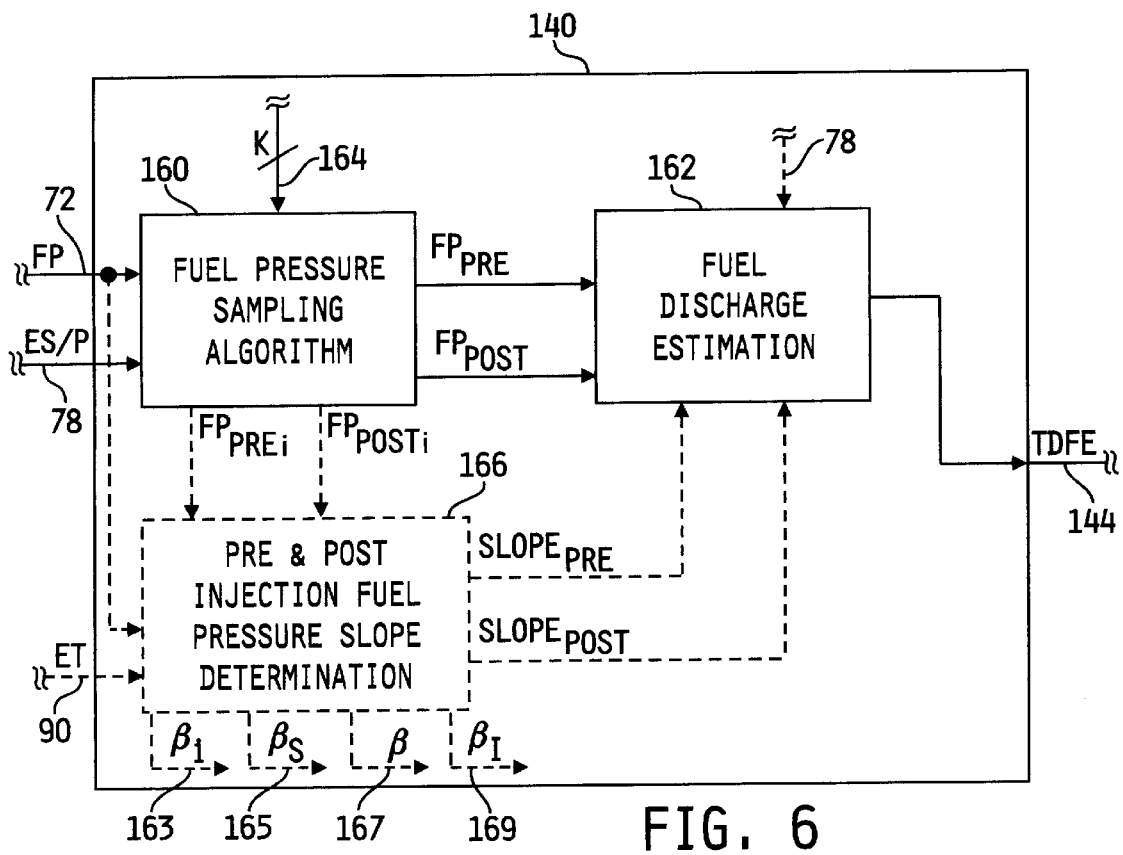
FIG. 6 is a diagrammatic illustration of one embodiment of the total discharged fuel estimation block of FIG. 5, in accordance with the present invention.

Referring now to FIG. 6, one preferred embodiment of the total discharged fuel estimate block 140 of FIG. 5, in accordance with the present invention, is shown. Block 140 includes a fuel pressure sampling algorithm 160 that is responsive to the fuel pressure signal (EP) on signal path 72 and the engine speed/position signal (ES/P) on signal path 78 to sample fuel pressure across a fuel injection event and produce a preinjection fuel pressure value ($FP_{PRE}$) and a post-injection fuel pressure ($FP_{POST}$) Preferably, the fuel pressure sampling algorithm 160 is operable to compute $FP_{PRE}$ and $FP_{POST}$ as average fuel pressures over predefined crank angle windows relative to crank TDC. For example, in one embodiment algorithm 160 is operable to sample the fuel pressure signal on signal path 72 every 2 degrees of crank angle, and to compute $FP_{PRE}$ as the average of eight fuel pressure values between −30 to −16 crank angle degrees prior to cylinder TDC, and $FP_{POST}$ as the average of eight fuel pressure values between 46 and 60 crank degrees after cylinder TDC. These sampling ranges are particularly desirable in one embodiment since the pre-injection sampling range occurs during the pressurization phase and slightly precedes the most advanced injection event, and the post-injection sampling range occurs during the expansion phase and slightly follows the end of the most retarded and longest injection event (see FIG. 2). It is to be understood, however, that other sampling ranges of any desired crank angle window can be used to provide the pre- and post-injection fuel pressure values $FP_{PRE}$ and $FP_{POST}$, respectively.

Optionally, the fuel pressure sampling algorithm 160 may be configured to receive a number, K, of additional signals or values via signal path 164, wherein algorithm 160 is responsive to such signals or values, in one embodiment, to more accurately match fuel pressure samples with actual crank angle values. An example of one such system operable to provide additional signals or values to algorithm 60 via signal paths 164 is described in co-pending U.S. application Ser. No. 09/564,776, entitled APPARATUS AND METHOD FOR DETERMINING ENGINE STATIC TIMING ERRORS AND OVERALL SYSTEM BANDWIDTH, which is assigned to the assignee of the present invention, and the contents of which are incorporated herein by reference. In accordance with the teachings of the foregoing reference, algorithm 160 is operable, in one embodiment, to receive a combined engine static timing and fuel pump phasing error value EST/FPP and an overall system bandwidth value BW via signal paths 164, whereby algorithm 160 is responsive to the EST/FPP and BW values to accurately match fuel pressure samples with crank angles at which such samples actually occur and thereby compensate for between-engine variations in such data.

The total discharged fuel estimate block 140 further includes a fuel discharge estimation block 162 operable to produce a total discharged fuel estimate (TDFE) on signal path 144 based on at least the pre- and post-injection fuel pressure values $FP_{PRE}$ and $FP_{POST}$ and optionally on the engine speed/position signal (ES/P) provided on signal path 78 as shown in phantom in FIG. 6. In one particular embodiment, block 162 comprises a regression-derived equation that produces the total discharged fuel estimate (TDFE) as a function of $FP_{PRE}$ and $FP_{POST}$ and also as a function of the engine speed/position signal (ES/P). For example, in this embodiment, the total discharged fuel estimate value (TDFE) is computed by block 162 in accordance with the equation $TDFE = a + b*FP_{PRE} + c*FP_{PRE}*FP_{PRE} + d*FP_{POST} + e*FP_{POST}*FP_{POST} + f*(ES/P)$, wherein a–f are regression parameters. Those skilled in the art will recognize that the foregoing regression equation parameters for estimating the total discharged fuel based at least on fuel pressure values may be determined using known and common curve-fitting techniques, and that other curve-fitting equations, model-based equations or other desired equations that are a function of at least, or only, $FP_{PRE}$ and $FP_{POST}$ may be substituted for the foregoing regression equation for determining TDFE, and that such alternate equations are intended to fall within the scope of the present invention. Examples of other curve-fitting techniques, for example, include, but are not limited to, least squares data-fitting techniques, and the like. In any case, signal path 144 is the output of block 162 and carries the total discharged fuel estimate (TDFE) produced by block 140.

In an alternative embodiment, the total discharged fuel estimate block 140 may be configured to include as part of the total discharged fuel estimate (TDFE) effects thereon of changes in the bulk modulus of the fuel contained in the fuel collection unit (as this term is defined hereinabove). For example, the relationship between energy stored in the fuel collection unit and the change in fuel volume is known to be dependent upon the effective bulk modulus of the system. In accordance with one aspect of the present invention, an estimate of the effective bulk modulus of the fuel system may thus be used to improve the total discharged fuel estimate (TDFE) of block 140.

The bulk modulus of a system expresses the resistance to volumetric reduction by pressure; i.e., the reciprocal of compressibility. The pressure developed in a fluid compression system depends on factors such as the system volume, the fluid's bulk modulus characteristics, the container compliance, flow rates into and out of the system, the rate of compression, and heat transferred to and from the system. When a liquid is subjected to compression, the volume occupied by the liquid is reduced as the pressure increases, wherein this relationship is given by the equation $\partial P = -\beta \partial V/V$.

Figure 7:
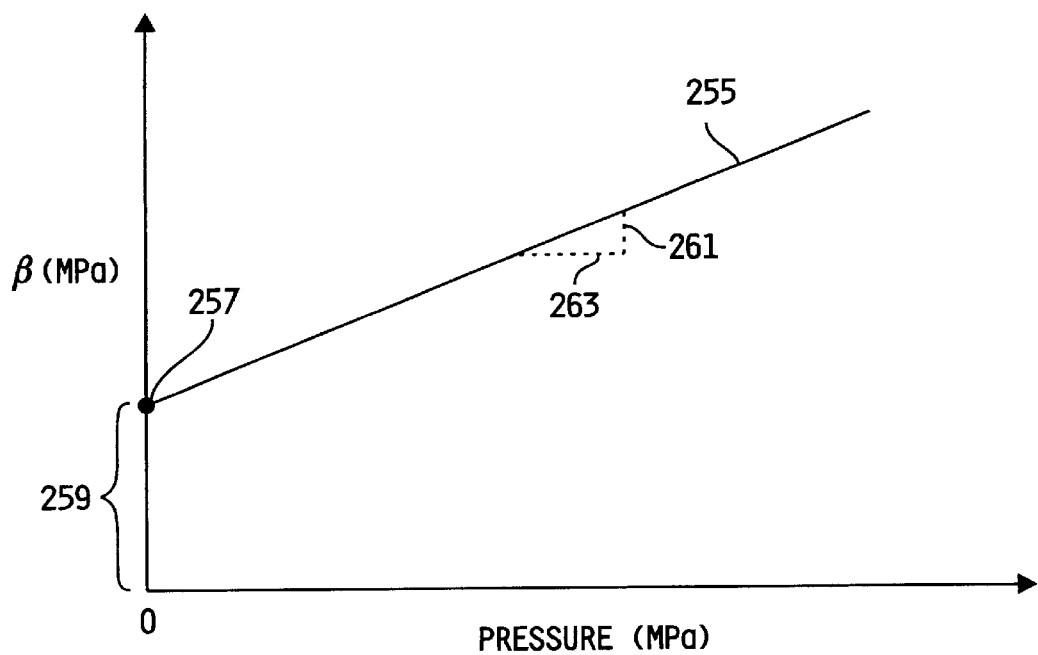
FIG. 7 is a plot of bulk modulus vs. fluid pressure for an example fluid illustrating a slope and offset value associated therewith.
Figure 8:
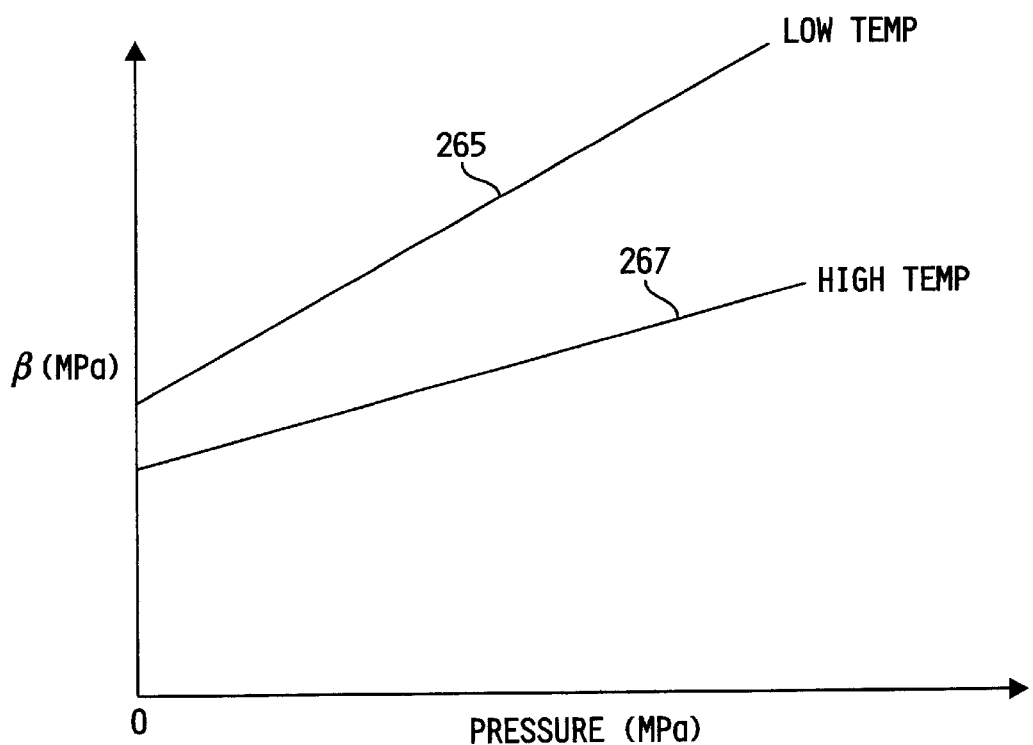
FIG. 8 is a plot of bulk modulus vs. fluid pressure for an example fluid illustrating a temperature dependency thereof.

A number of techniques for characterizing the bulk modulus of fluids and fuels are known such as, for example, using a P-V-T (pressure-volume-temperature) technique or using an ultrasonic velocity technique. As a result of these techniques, the bulk modulus of a fluid has been found to vary with pressure, temperature and molecular structure. For fluids such as diesel fuel, the bulk modulus value has been observed to increase almost monotonically with pressure, and decrease as fuel temperature increases. For example, referring to FIG. 7, a plot of bulk modulus ($\beta$) 255 of a fluid such as diesel fuel is shown vs. fluid pressure, wherein the bulk modulus function 255 intercepts the zero pressure line at intercept 257 producing a bulk modulus offset value 259. The slope of the bulk modulus function 255 is shown as a unit change in B divided by a unit change in pressure. Referring to FIG. 8, plots of bulk modulus ($\beta$) vs. fluid pressure are shown for two different fluid temperatures. Bulk modulus function 265 represents the bulk modulus value at a low fluid temperature and bulk modulus function 267 represents the bulk modulus value at a high fluid temperature. It should be readily apparent from FIG. 8 that not only is the bulk modulus of the fluid higher at low temperatures for any given fluid pressure than at high temperatures, but that the slopes and zero-pressure intercepts are also different for the two temperature extremes.

Moreover, the bulk modulus of a fluid blend has been found to be directly proportional to the bulk moduli of the fluid components. For example, water has a higher bulk modulus than diesel fuels which results in an increase in the bulk moduli of diesel fuel blends as the water fraction increases. The bulk modulus also increases with an increase in the specific gravity of the fuel.

In accordance with the present invention, fuel system components that are packaged in the general form a fluid pressurizing pump connected to a high-pressure energy storage device connected to one or more electronically operable injector nozzles have been determined through experimentation to have similar characteristics to the P-V-T bulk modulus measurement technique. As the fluid (e.g., diesel fuel) is pressurized by a pumping element, the current operating bulk modulus characteristics of the system can, in accordance with the present invention, be estimated at each pressurization or injection cycle using information relating to changes in fuel pressure across a fuel injection event.

Figure 9:
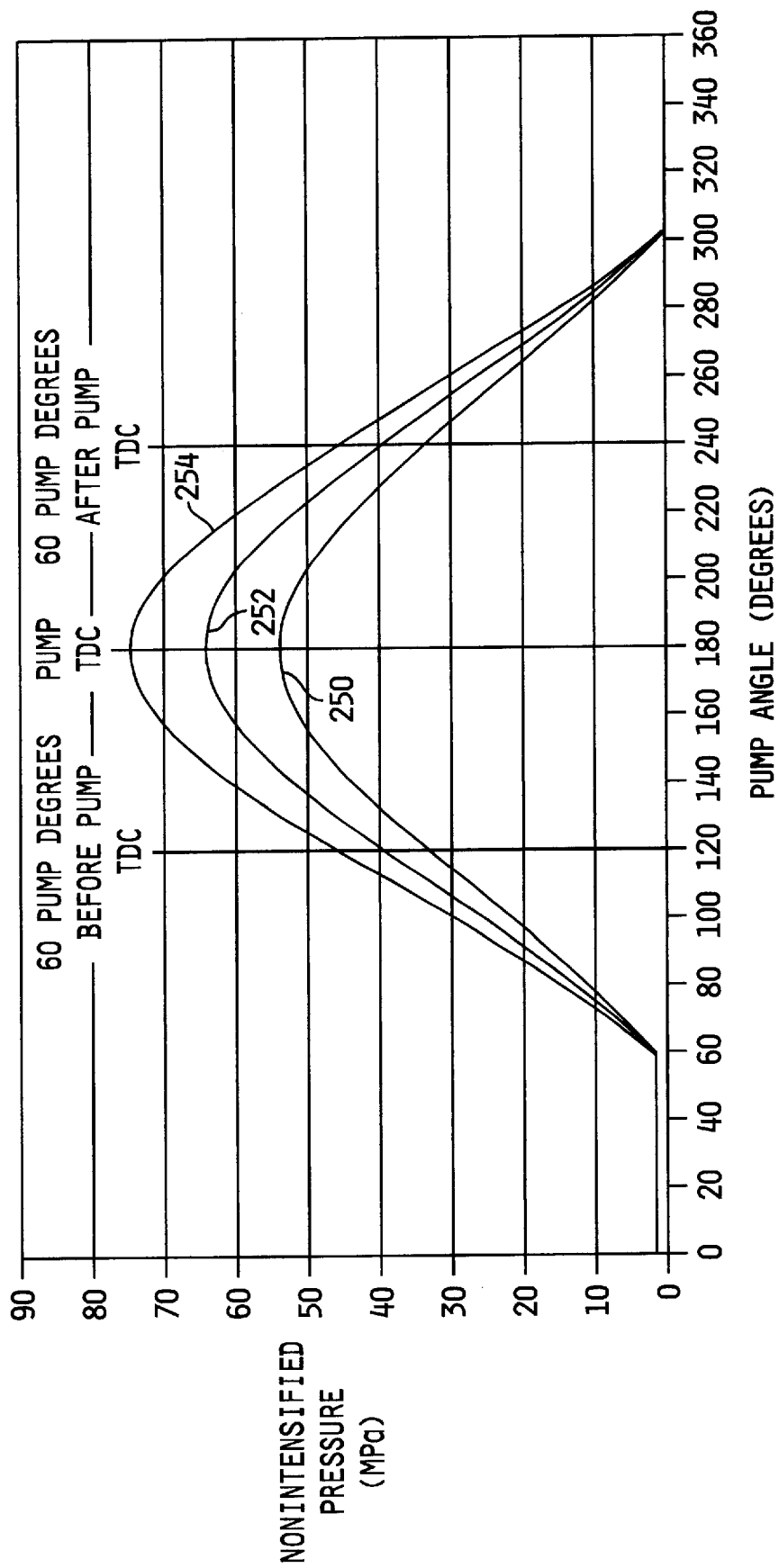
FIG. 9 is a plot of fuel pump pressure vs. pump angle for fluids having different bulk modulus values.

Referring now to FIG. 9, the effect of an offset in the tangent bulk modulus of fuel contained in the fuel collection unit as a function of fuel pressure on the pressurization and depressurization of a fuel system is shown. FIG. 9 shows three pressure curves as a function of an angle of fuel pump 54 relative to a reference pump position; i.e., pump top-dead-center (TDC). Each of the three pressure curves corresponds to a different tangent bulk modulus value of the fuel contained within the fuel collection unit. For example, fuel pressure curve 250 has a tangent bulk modulus value of 1,000 MPa, fuel pressure curve 252 has a tangent bulk modulus value of 1,200 MPa, and fuel pressure curve 254 has a tangent bulk modulus value of 1,400 MPa. The offsets in tangent bulk modulus illustrated in FIG. 9 may be the result of any of a number of factors such as, for example, a change in temperature or a change in the pressurized volume, but could also be the result of changes in fuel properties. In any case, the pressure curves 250, 252 and 254 illustrate that fuel pressure increases as the tangent bulk modulus increases.

Figure 10:
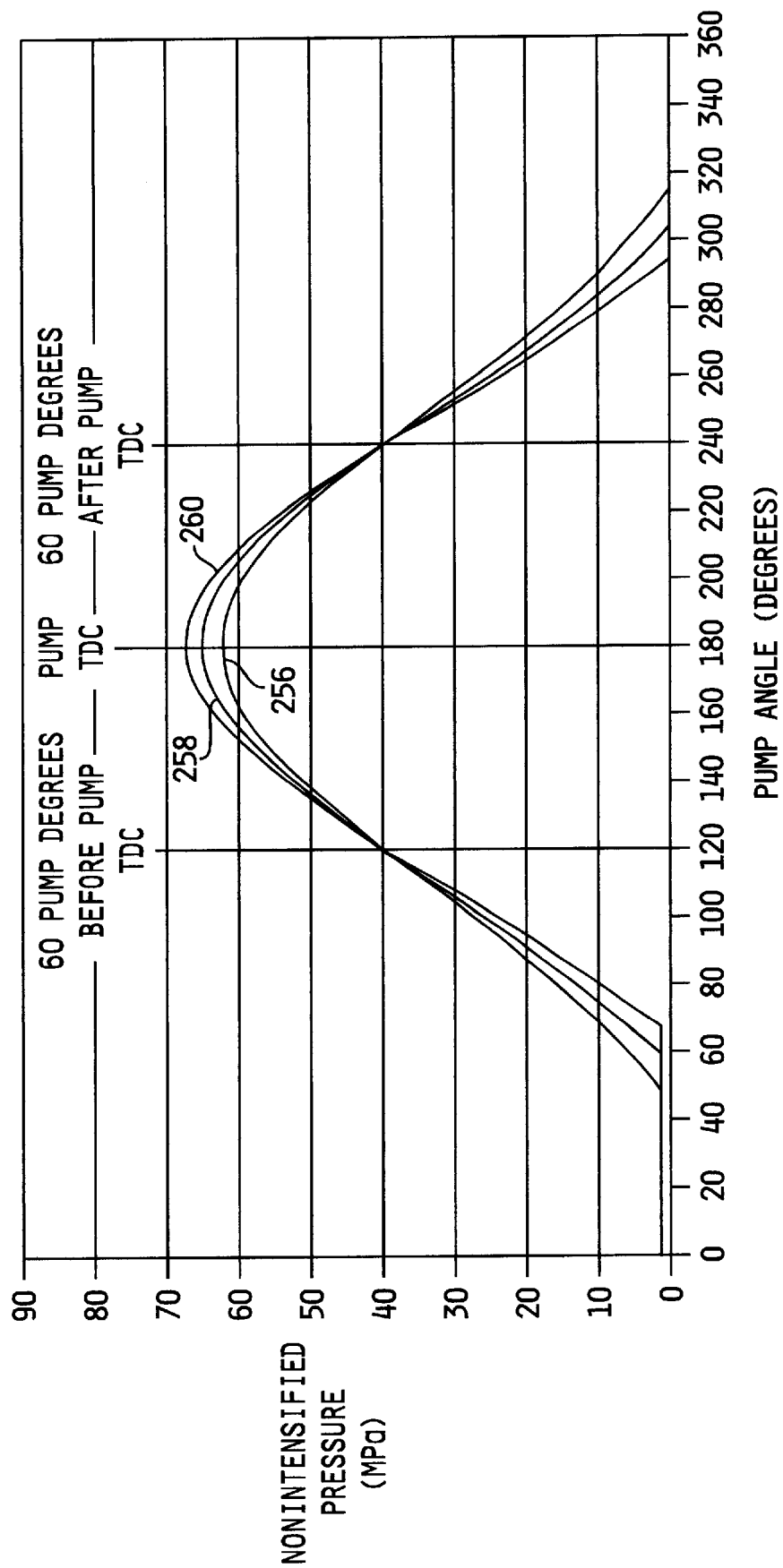
FIG. 10 is a plot of the fuel pump pressure vs. pump angle of FIG. 9 with the start of pressurization values adjusted for equal pressure values at 60 degrees before and after pump TDC.

In most fuel systems, the start of pressurization can be controlled, whereby the start of pressurization can be adjusted in order to obtain the same pressure at a pump position for the different tangent bulk modulus values. For example, referring now to FIG. 10, pressure curves 256, 258 and 260 correspond directly to pressure curves 250, 252 and 254 of FIG. 9 with the start of pressurization adjusted in order to obtain the same pressure at 60 pump degrees before pump TDC. Although the pressures are the same at the specified pump position, it can be seen that the rate of change of fuel pressure as a function of the pump position differs for each tangent bulk modulus value.

Figure 11:
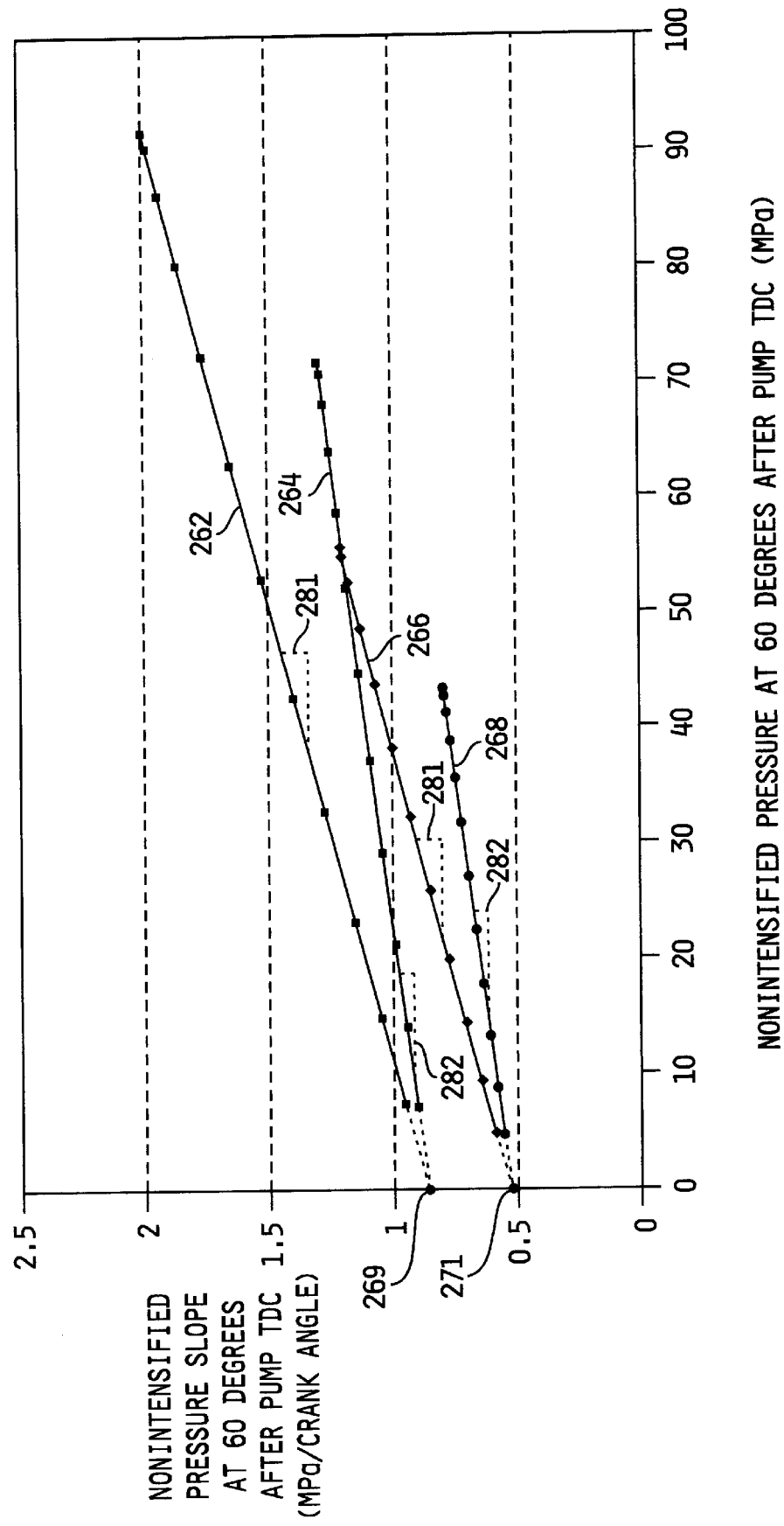
FIG. 11 is a plot of fuel pump pressure slope vs. fuel pump pressure at 60 degrees after pump TDC, illustrating distinct pressure and rate of pressure change characteristics for different bulk modulus values.
Figure 12A:
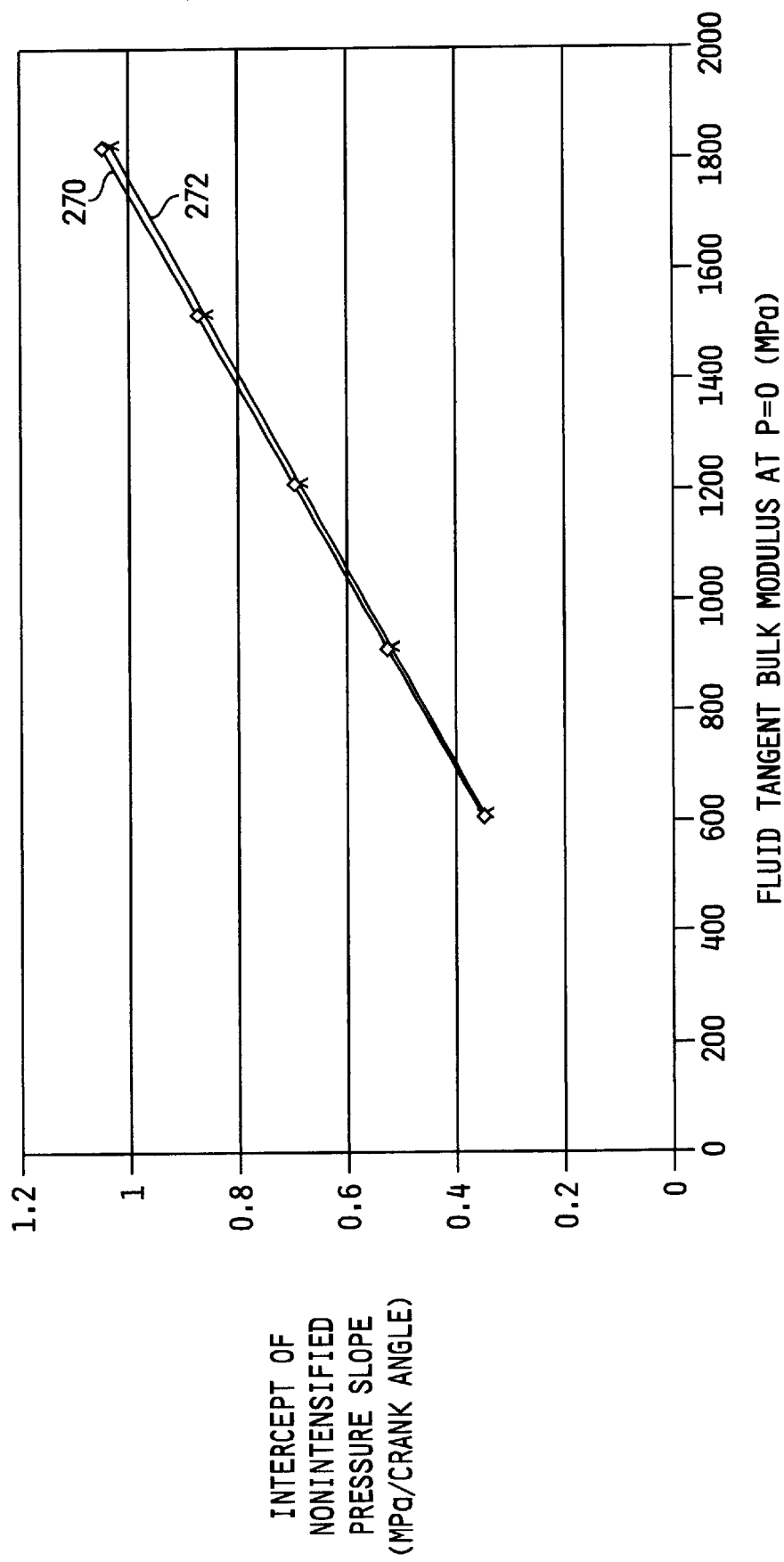
FIG. 12A is a plot of the intercept of the curve of the fuel pump pressure slope vs. fuel pump pressure illustrating the relationship of the intercept of the fuel pump pressure slope curve to the tangent bulk modulus offset.
Figure 12B:
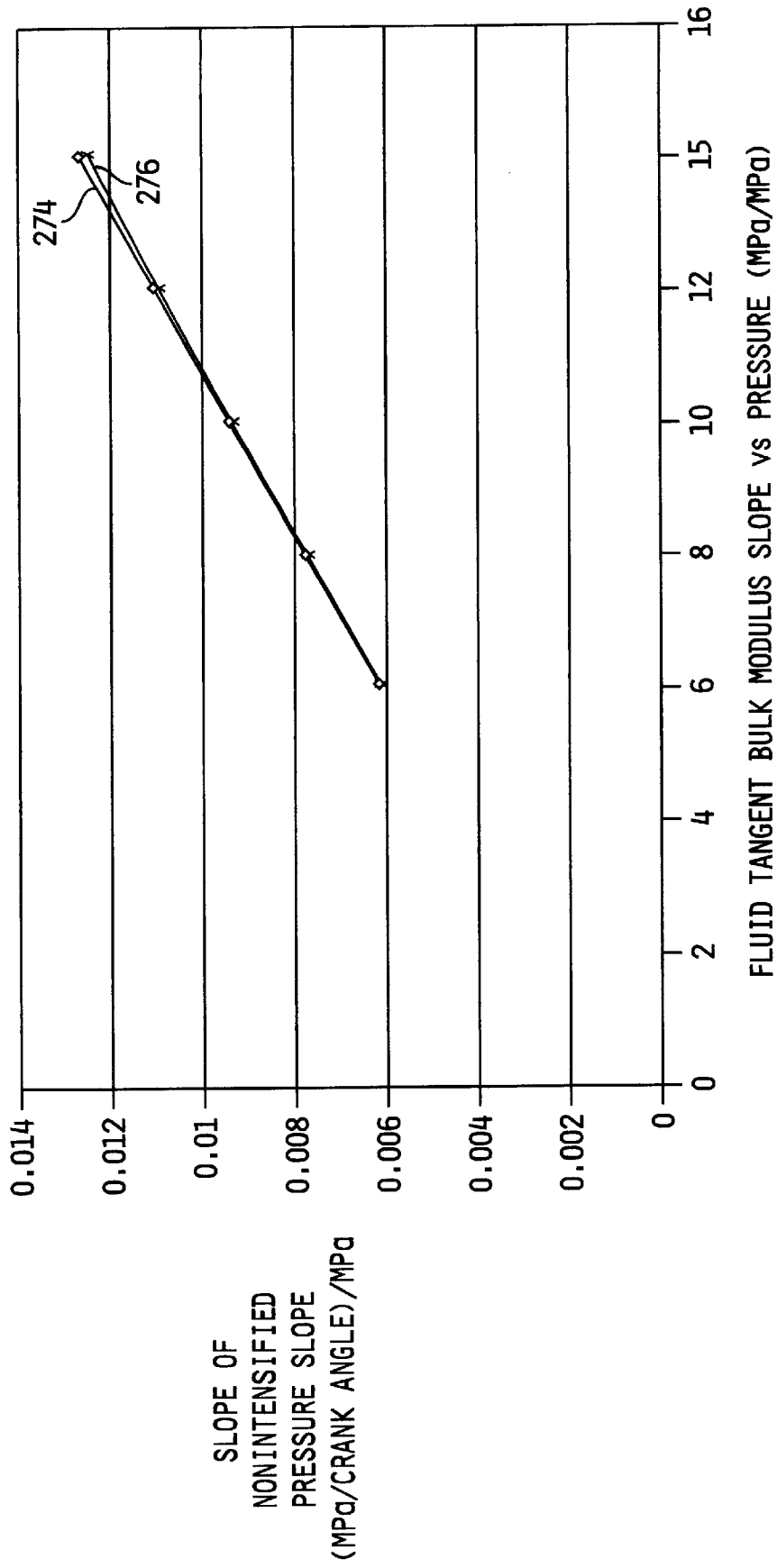
FIG. 12B is a plot of the slope of the fuel pump pressure vs. fuel pump pressure illustrating the relationship of the fuel pump pressure slope to the tangent bulk modulus slope.

In accordance with the present invention, test cases were modeled for different bulk modulus characteristics as the start of pump pressurization and the volume of fluid removed from the system were varied. Results of these tests are shown in FIG. 11 which illustrates that for each bulk modulus curve as a function of pressure, a unique combination of pressures and rate of changes of pressure result. For the system modeled, these combinations of pressure and rate of changes of pressure were found to be on unique lines for each bulk modulus combination. Increasing the tangent bulk modulus at 0 MPa (a bulk modulus offset) produced an offset in the pressure slope as a function of pressure at a sampled pump position. Increasing the tangent bulk modulus slope as a function of pressure produced an increase in the slope of the curve of the pressure slope as a function of pressure at the selected pump sampling position. Within FIG. 11, for example, lines 262 and 266 had a tangent bulk modulus slope versus fuel pressure value of 14, whereas line 262 has a tangent bulk modulus at 0 MPa of 1,500 MPa and line 266 has a tangent bulk modulus at 0 MPa of 900 MPa. By contrast, line 264 has a tangent bulk modulus at 0 MPa of 1,500 MPa, yet has a tangent bulk modulus slope versus fuel pressure of 6. Likewise, line 268 has a tangent bulk modulus slope versus fuel pressure of 6, yet has a tangent bulk modulus at 0 MPa of 900 MPa. From FIG. 11, it is apparent that a combination of pressure and the rate of change in pressure at a specified pump position can be used to estimate the effective bulk modulus of a system and the bulk modulus of a fluid. For the system modeled, the intercepts (e.g., points 269 and 271 in FIG. 11) of the curve of the pressure slope as a function of the fuel pressure are related to the tangent bulk modulus offset. Referring to FIG. 12A, this relationship is shown wherein line 270 corresponds to 60 pump degrees after pump TDC and line 272 corresponds to 60 degrees prior to pump TDC. Similarly, the slopes (e.g., slopes 281 and 282 in FIG. 11) of the curve of the pressure slope as a function of the fuel pressure are related to the tangent bulk modulus slope. Referring to FIG. 12B, the slope of the curve of the fuel pressure slope as a function of the fuel pressure, as shown in FIG. 11, is shown to be related to the tangent bulk modulus slope as a function of fuel pressure wherein line 274 corresponds to 60 pump degrees after pump TDC and line 276 corresponds to 60 pump degrees prior to pump TDC.

Referring back to FIG. 6, the total discharged fuel estimate block 140 may be modified in accordance with concepts just described, to take into account in the calculation of the total discharged fuel estimate (TDFE) effects of changes in bulk modulus of the fuel. For example, block 140 may include a pre- and post-injection fuel pressure slope determination block 166 receiving the individual pre-injection fuel pressure values $FP_{PRE}I$ and individual post-injection fuel pressure values $FP_{POST}I$ from the fuel pressure sampling algorithm 160. Optionally, block 166 may be configured to receive the engine temperature (or fuel temperature) signal via signal path 90, as shown in phantom. In any case, block 166 is operable to determine in accordance with well-known equations, the slope of the pre-injection fuel pressure signal during the predefined crank angle window ($SLOPE_{PRE}$) and the post-injection slope of the fuel pressure signal during the predefined crank angle window ($SLOPE_{POST}$), respectively. The fuel pressure slope values are then provided to the fuel discharge estimation block 162 wherein block 162 is configured, in this embodiment, to compute TDFE as a function of at least $FP_{PRE}$, $FP_{POST}$, $SLOPE_{PRE}$ and $SLOPE_{POST}$. In one embodiment, for example, fuel discharge estimation block 162 is operable to compute the discharged fuel estimate TDFE in accordance with a regression equation of the type described hereinabove with respect to the previous embodiment of block 140, wherein at least the values $SLOPE_{PRE}$ and $SLOPE_{POST}$ are used in addition to the values $FP_{PRE}$ and $FP_{POST}$ (e.g., $TDFE = a + b*FP_{PRE} + c*FP_{PRE}*FP_{PRE} + d*FP_{POST} + e*FP_{POST}*FP_{POST} + f*SLOPE_{PRE} + g*SLOPE_{PRE}*SLOPE_{PRE} + h*SLOPE_{POST} + i*SLOPE_{POST}*SLOPE_{POST} + j*(ES/P)$, wherein a–j are regression parameters). As with the previously discussed embodiment of block 162, however, those skilled in the art will recognize that the foregoing equation parameters may be determined using known and common curve-fitting techniques, and that other curve-fitting equations, model-based equations or other desired equations that are a function of at least $FP_{PRE}$, $FP_{POST}$, $SLOPE_{PRE}$ and $SLOPE_{POST}$ may be substituted for the foregoing regression equation for determining TDFE, and that such alternate equations are intended to fall within the scope of the present invention. Examples of other curve-fitting techniques, for example, include, but are not limited to, least squares data-fitting techniques, and the like. In any case, signal path 144 is the output of block 162 and carries the total discharged fuel estimate (TDFE) produced by block 140.

Block 166 may additionally be configured to produce an instantaneous bulk modulus value $\beta_i$ on signal path 163 corresponding to the instantaneous bulk modulus of the pressurized fuel, a bulk modulus slope value $\beta_s$ on signal path 165 corresponding to a slope of the bulk modulus function over a range of fuel pressure values, a bulk modulus intercept value $\beta_I$ corresponding to a zero-pressure bulk modulus value of the bulk modulus function on signal path 169 and a bulk modulus function $\beta$.

Figure 13:
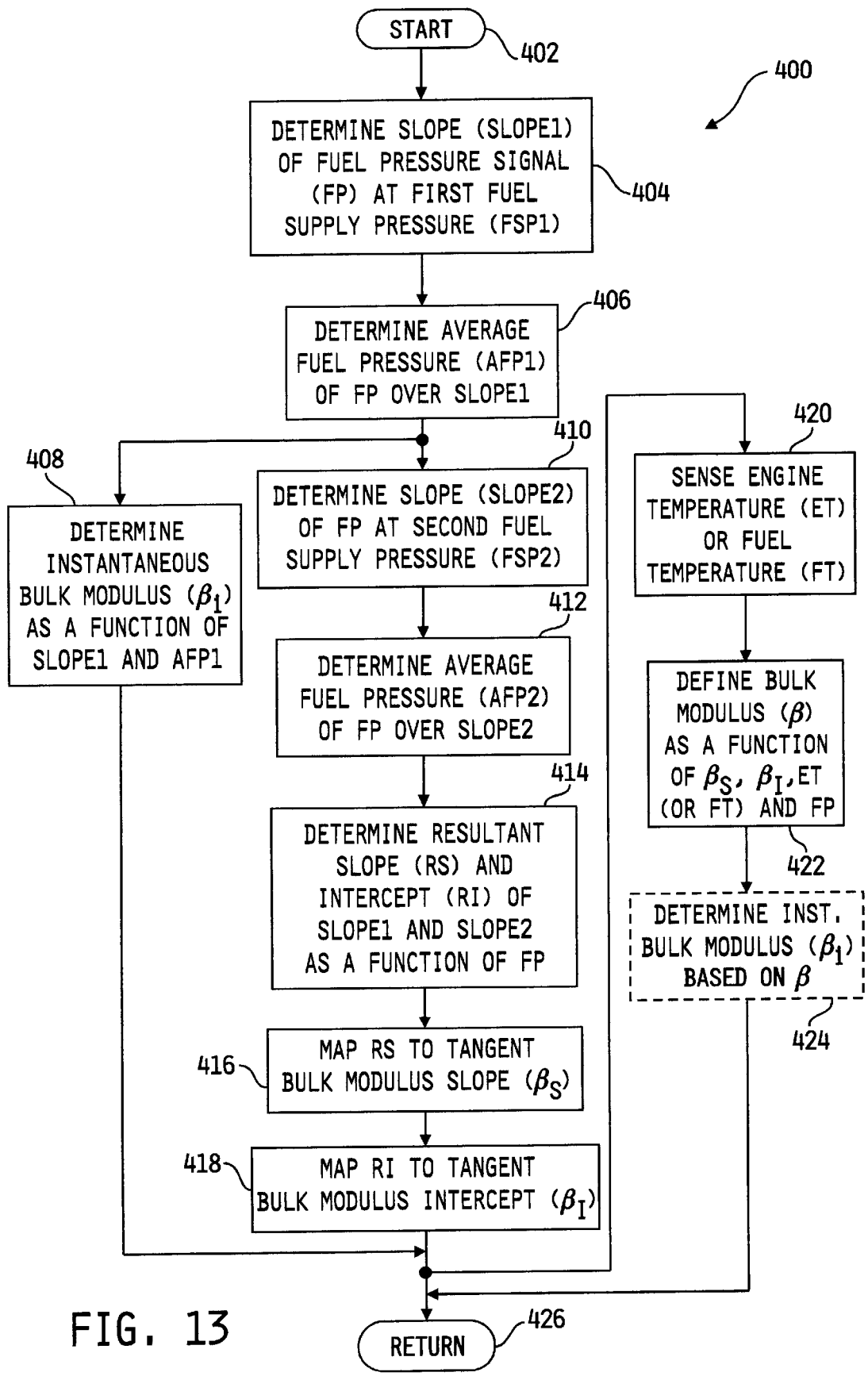
FIG. 13 is a flowchart illustrating one preferred embodiment of a software algorithm for determining bulk modulus properties of the fuel within fueling system 50 or 50', in accordance with another aspect of the present invention.

Referring to FIG. 13, one preferred embodiment of a software algorithm 400 for determining the foregoing bulk modulus information, in accordance with another aspect of the present invention, is shown. Algorithm 400 is preferably stored within memory 75 and is executable via control circuit 68. Algorithm 400 begins at step 402 and at step 404 control circuit 68 is operable to determine the slope (SLOPE1) or rate of change of the fuel pressure signal (FP) at a first fuel supply pressure (FSP1). Generally, control circuit 68 is operable at step 404 to determine SLOPE1 anywhere along the cyclically varying fuel pressure signal on signal path 72, although as a practical matter, some fuel pressure ranges may be better suited than others for determining the slope value, wherein the particular fuel system configuration will typically dictate such fuel pressure ranges. In one known fuel system, for example, the post-injection portion of the fuel pressure signal on signal path 72 is less noisy than the pre-injection portion and the slope values SLOPE1 of step 404 is therefore preferably determined along a crank angle window corresponding to the post-injection portion of the fuel pressure signal on signal path 72. In this embodiment, fuel pressure samples for determining SLOPE1 are preferably taken during vehicle motoring conditions (i.e., zero-fueling conditions) so that fluid volumes remain relatively constant during the post-injection area of the fuel pressure signal. As this embodiment relates to fuel system 50 or 50' of the present invention, control circuit 68 may be operable at step 404 to either sample the fuel pressure signal FP during a desired post-injection crank angle window, or may alternatively use the already available $FP_{POSTi}$ values. In either case, control circuit 68 is operable to compute SLOPE1 from the number of fuel pressure samples using well-known equations. In other fuel systems, the pre-injection portion of the fuel pressure signal on signal path 72 may be less noisy than other portions of the fuel pressure signal, and it may therefore be preferable to compute SLOPE1 at step 404 during a desired crank angle window corresponding to the pre-injection portion of the fuel pressure signal FP. In this embodiment, the fuel pressure signal samples need not be taken under motoring conditions and may instead be taken under normal operating conditions. As this embodiment relates to fuel system 50 or 50' of the present invention, control circuit 68 may be operable at step 404 to either sample the fuel pressure signal FP during a desired pre-injection crank angle window, or may alternatively use the already available $FP_{PREi}$ values. Those skilled in the art will recognize that other portions of the fuel pressure signal on signal path 72 may be sampled for subsequent calculation of SLOPE1 at step 404, and that such alternative fuel pressure sampling strategies are intended to fall within the scope of the present invention.

From step 404, algorithm 400 advances to step 406 where control circuit 68 is operable to determine an average fuel pressure value (AFP1) of the fuel pressure values used in the determination of SLOPE1 at step 404. In one embodiment, for example, control circuit 68 is operable at step 406 to determine AFP1 as a mean pressure value over the range of pressure values used in the determination of SLOPE1 at step 404. In any case, algorithm 400 preferably follows two separate branches from step 406. Along a first branch, algorithm execution advances from step 406 to step 408 where control circuit 68 is operable to compute an instantaneous bulk modulus value, $\beta_i$ as a known function of SLOPE1 and AFP1. For example, control circuit 68 is operable in one embodiment to determine the instantaneous bulk modulus value $\beta_i$ from the relationship $\partial P = -\beta \partial V/V$ described hereinabove. Algorithm 400 advances from step 408 to step 426 where execution of algorithm 400 awaits return to its calling routine.

Along a second branch, algorithm 400 advances from step 406 to step 410 where control circuit 68 is operable to determine a slope (SLOPE2) of the fuel pressure signal (FP) at a second fuel supply pressure (FSP2) using any of the techniques described hereinabove with respect to step 404. Preferably, control circuit 68 is operable to determine the SLOPE1 and SLOPE2 values at identical crank angle windows with two discernibly different fuel supply pressures. In any case, algorithm 400 advances from step 410 to step 412 where control circuit 68 is operable to determine an average fuel pressure value (AFP2) of the fuel pressure values used to determine SLOPE2. In one embodiment, control circuit 68 is operable to determine AFP2 as a mean value of the pressure samples used to compute SLOPE2. From step 412, algorithm execution advances to step 414.

At step 414, control circuit 68 is operable to determine a resultant slope (RS) of the fuel pressure slope and a resultant intercept (RI) of the fuel pressure slope as a function of fuel pressure. In one embodiment, control circuit 68 is operable to execute step 414 by computing a first-order equation of pressure slope vs. average pressure value using SLOPE1, SLOPE2, AFP1 and AFP2. The slope of this first order equation is the resultant slope (RS), and the resultant intercept (RI) is the value of the first-order equation at zero pressure. Alternatively, the present invention contemplates using other known mathematical techniques for determining RS and RI, and such other known techniques should be understood to fall within the scope of the present invention.

In any case, algorithm execution continues from step 414 to 416 wherein control circuit 68 is operable map the resultant slope of the fuel pressure slope determined at step 414 to a tangent bulk modulus slope ($\beta_s$). In one embodiment, memory unit 75 of control circuit 68 has stored therein a relationship between the slope of the fuel pressure slope and tangent bulk modulus slope such as that illustrated in FIG. 12B, whereby control circuit 68 is operable to determine $\beta_s$ directly from this relationship. Those skilled in the art will recognize that the relationship between slope of the fuel pressure slope and tangent bulk modulus slope may be implemented in a number of different forms such as by a table, graph, one or more mathematical equations, or the like.

Algorithm 400 advances from step 416 to step 418 where control circuit 68 is operable to map the resultant intercept (RI) of the fuel pressure slope determined at step 414 to a tangent bulk modulus intercept ($\beta_I$). In one embodiment, memory unit 75 of control circuit 68 has stored therein a relationship between the intercept (RI) of the fuel pressure slope and tangent bulk modulus intercept such as that illustrated in FIG. 12A, whereby control circuit 68 is operable to determine $\beta_I$ directly from this relationship. Those skilled in the art will recognize that the relationship between the intercept of the fuel pressure slope and tangent bulk modulus intercept $\beta_I$ may be implemented in a number of different forms such as by a table, graph, one or more mathematical equations, or the like. In any case, algorithm 400 preferably advances along two separate branches following execution of step 418. Along a first path, step 418 advances to step 426 where algorithm 400 awaits return to its calling 10 routine. Along a second path, step 418 advances to step 420.

By the nature of their use, diesel engines are required to operate over a wide temperature range and with a wide range of fuel blends. If the engine fuel temperature signal is supplied as an input to block 166 via signal path 90, the bulk modulus characteristics of the system and fuel as a function of temperature can easily be determined given the tangent bulk modulus slope $\beta_s$ and tangent bulk modulus intercept $\beta_I$ values determined at steps 416 and 418. At step 420, control circuit 68 is thus operable to sense engine temperature ET or fuel temperature FT, and at step 422 control computer 68 is operable to define a bulk modulus function $\beta$ using well-known equations, wherein $\beta$ is a function of $\beta_I$, $\beta_s$, ET (or FT) and fuel pressure FP. It should be noted that control circuit 68 determines at step 422 a bulk modulus function $\beta$ similar to that illustrated graphically in FIG. 8 for the fuel (e.g., diesel fuel) supplied by the fuel collection unit. This fluid bulk modulus information can be used, for example, with other engine control functions to obtain additional information about the fuel using known relationships between bulk modulus characteristics and other fluid properties such as, for example, density, viscosity, sonic speed, specific heat and heating value. Information relating to these fuel properties may be leveraged by other engine control systems to improve engine and fuel system performance.

The branch of algorithm 400 including steps 420 and 422 may optionally include a step 424 wherein control circuit 68 is operable to determine an instantaneous bulk modulus value $\beta_i$ based on the bulk modulus function $\beta$ determined at step 422. In any case, algorithm 400 advances from step 424 (or from step 422 if step 424 is omitted) to step 426 where algorithm 400 is returned to its calling routine. It is to be understood that while algorithm 400 is shown and described as executing three distinct branches, control circuit 68 may be configured to execute only any one or combination of the three branches, depending upon the type and amount of information desired. For the embodiment illustrated in FIG. 6, however, block 166 is preferably operable to produce the instantaneous bulk modulus value $\beta_i$ on signal path 163, the bulk modulus slope value $\beta_s$ on signal path 165, the bulk modulus intercept value $\beta_I$ on signal path 169, and the bulk modulus function $\beta$ on signal path 167.

Figure 14:
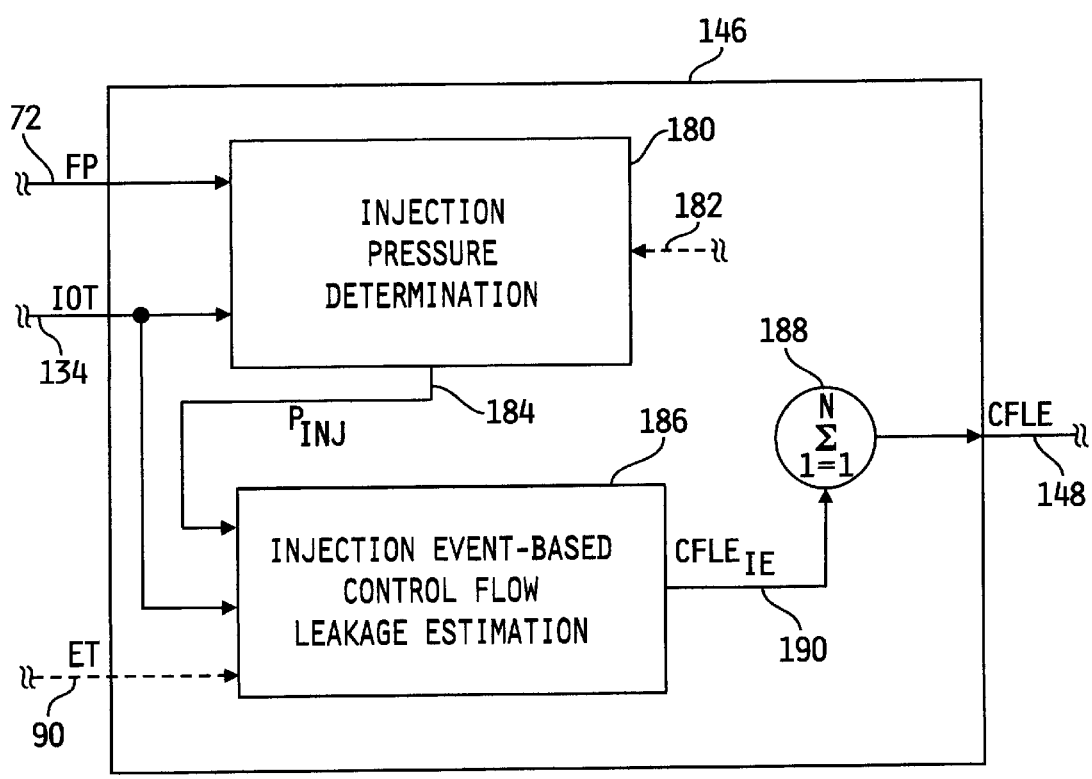
FIG. 14 is a diagrammatic illustration of one embodiment of the control flow estimation block of FIG. 5, in accordance with the present invention.

Referring now to FIG. 14, one preferred embodiment of the control flow leakage estimate block 146 of FIG. 5, in accordance with the present invention, is shown. Block 146 includes a fuel injection pressure determination block 180 receiving the fuel pressure signal (FP) via signal path 72 and the commanded fuel signal (injector on-time signal IOT) via signal path 134. Additionally, block 180 may receive one or more engine operating signals via signal path 182. Such engine operating signals may include, but are not limited to, an injector timing signal, an injector delay signal, and the like. In any case, block 180 is responsive to at least the fuel pressure signal and the commanded 30 fueling signal (injector on-time signal) to compute a representative fuel injection pressure value ($P_{INJ}$) and provide the $P_{INJ}$ value on signal path 184, wherein $P_{INJ}$ corresponds to an average pressure of fuel injected into a combustion chamber of engine 66 via fuel injector 60 pursuant to a fuel injection event. In one specific embodiment, block 180 is operable to determine $P_{INJ}$ in accordance with the equation:

$$P_{INJ} = \left(\sum_{n=m1}^{m2} \text{fuel pressure}\right) \Big/ (m2 - m1 + 1),$$

wherein $m1 = 0.5 * (\text{injector timing} + 30)$ and $m2 =$ $$m1 + (750/\text{engine speed}) * \left(\sum_{y=1}^{4} IOT + \sum_{n=12,23,34} \text{injector delay}\right),$$

and wherein the constant values in the foregoing equations are dictated by the specific engine, vehicle, fuel system, etc. configuration. In cases wherein the fuel injector 60 includes a pressure intensifier, as this term is commonly understood in the art, the estimated fuel injection pressure is computed as a product of $P_{INJ}$ and an intensification ratio of the pressure intensifier. Those skilled in the art will recognize that the determination of $P_{INJ}$ according to the foregoing technique will depend in large part upon the particulars of the engine and fuel system, that the foregoing equation will require modification depending upon the engine and fuel system used, and that such modifications are intended to fall within the scope of the present invention. In a general sense, though, it is to be understood that determination of the average injected fuel pressure $P_{INJ}$ is a measure of the fuel storage pressure signal only during fuel injection events.

The present invention contemplates alternate techniques for determining the representative fuel injection pressure, $P_{INJ}$, and some of these contemplated techniques are set forth in co-pending U.S. patent application Ser. No. 09/564, 240, entitled FUEL INJECTION PRESSURE CONTROL SYSTEM FOR AN INTERNAL COMBUSTION ENGINE, which is assigned to the assignee of the present invention, and the contents of which is incorporated herein by reference. Those skilled in the art will recognize that such alternate techniques for determining $P_{INJ}$, including those described in the foregoing reference, are intended to fall within the scope of the present invention.

Figure 16:
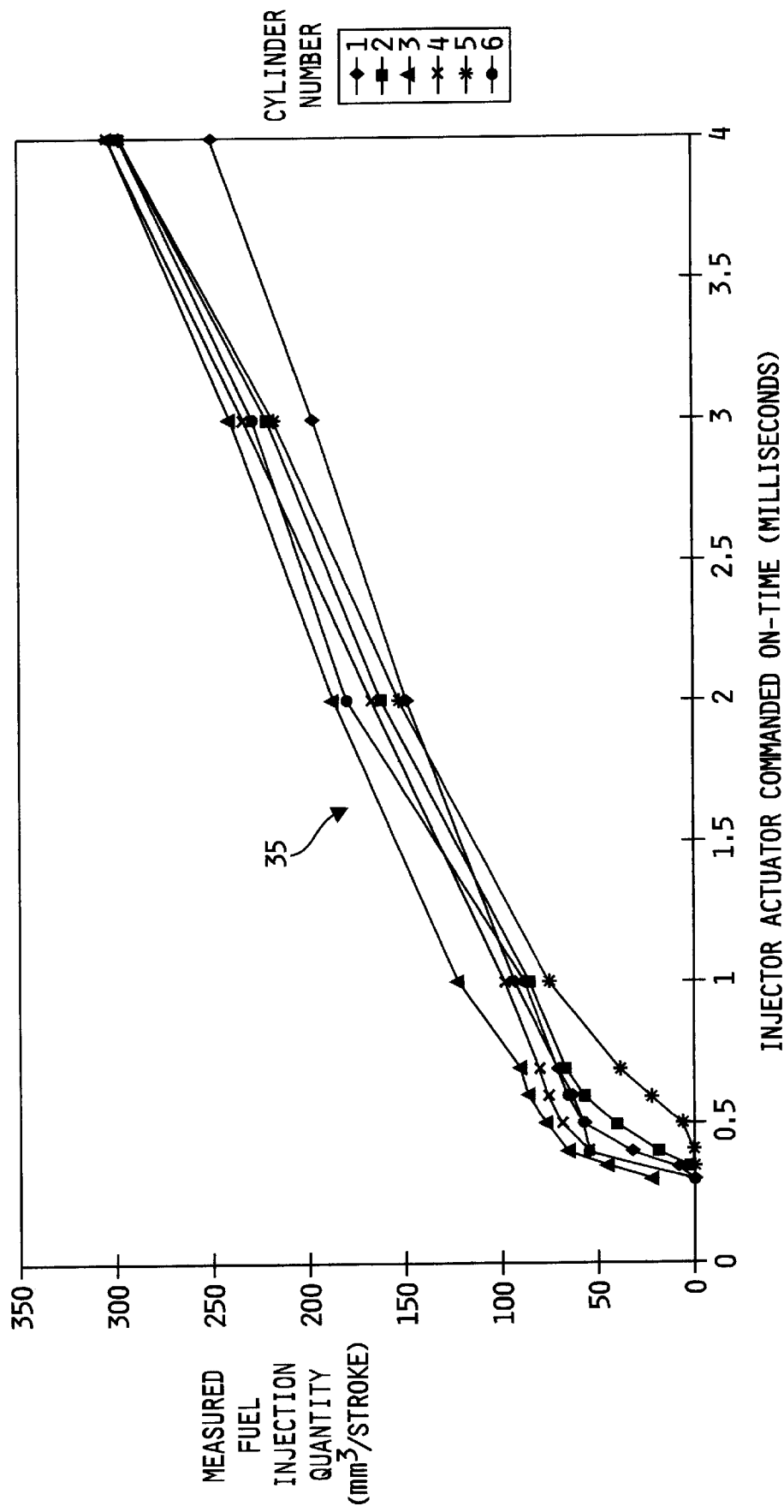
FIG. 16 is a plot of measured fuel injection quantity by cylinder vs. commanded injector on-time for a known fuel injection control system.
Figure 17:
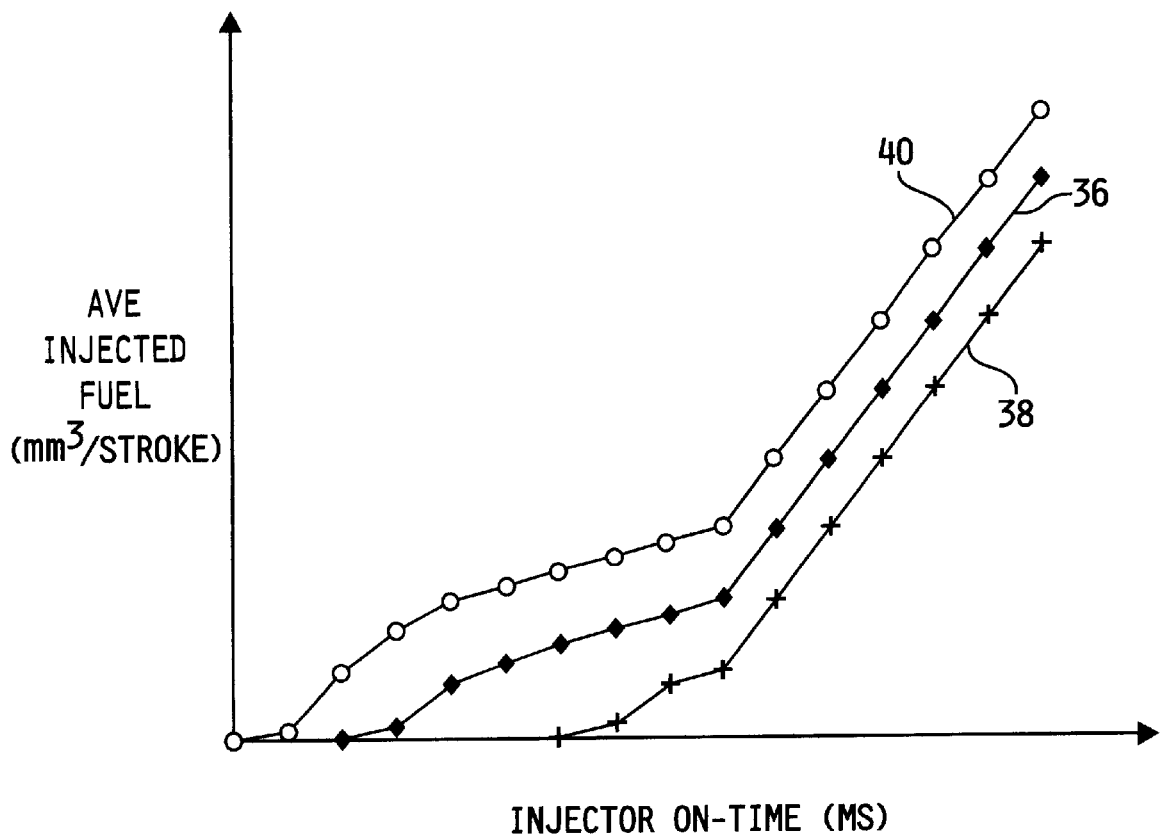
FIG. 17 is a plot of average fuel injection quantity vs. injector on-time illustrating engine fueling extremes for a known fuel injection control system.

Block 146 further includes an injection event-based control flow leakage estimation block 186 that is responsive to the $P_{INJ}$ value on signal path 184 and the commanded fueling signal (injector on-time signal) on signal path 134 to produce a control flow leakage estimate value for each injection event ($CFLE_{IE}$) on signal path 190. In one embodiment, block 186 comprises a two-dimensional look-up table having as table inputs the average injection pressure ($P_{INJ}$) and the injector on-time signal (IOT), and having as the table output the control flow leakage estimate value $CFLE_{IE}$. It is to be understood, however, that such a look-up table represents only one preferred embodiment of block 186, and that the present invention contemplates other techniques for determining the $CFLE_{IE}$ values. Examples of such other techniques include, but are not limited to, equations, other tables, graphs and/or the like, wherein such equations, other tables, graphs and/or the like are intended to fall within the scope of the present invention. Optionally, as shown in phantom in FIG. 14, block 186 may be configured to receive the engine temperature (or fuel temperature) signal ET via signal path 90, in which case block 186 may comprise a three-dimensional look-up table or the like. In any case, signal path 190 is connected to an input of a summing node 188, wherein summing node 188 is operable to sum each of a number, N, of individual control flow leakage estimates $CFLE_{IE}$, wherein N may be any positive integer, with N=4 being a typical value. The output of summing node 188 is connected to signal path 148 and is the control flow leakage estimate CFLE that is supplied to summing node 142 of FIG. 5. Preferably, a cylinder balancing algorithm is executed in all embodiments of the present invention that include the control flow leakage estimation block 146, wherein one particularly useful cylinder balancing algorithm is described in U.S. Pat. No. 6,021,758, which is assigned to the assignee of the present invention, and the contents of which are incorporated herein by reference. While a cylinder balancing algorithm is not required with the present invention, such an algorithm will act to tighten up the distribution of between-cylinder fuel injection amounts illustrated in FIG. 16.

Figure 15:
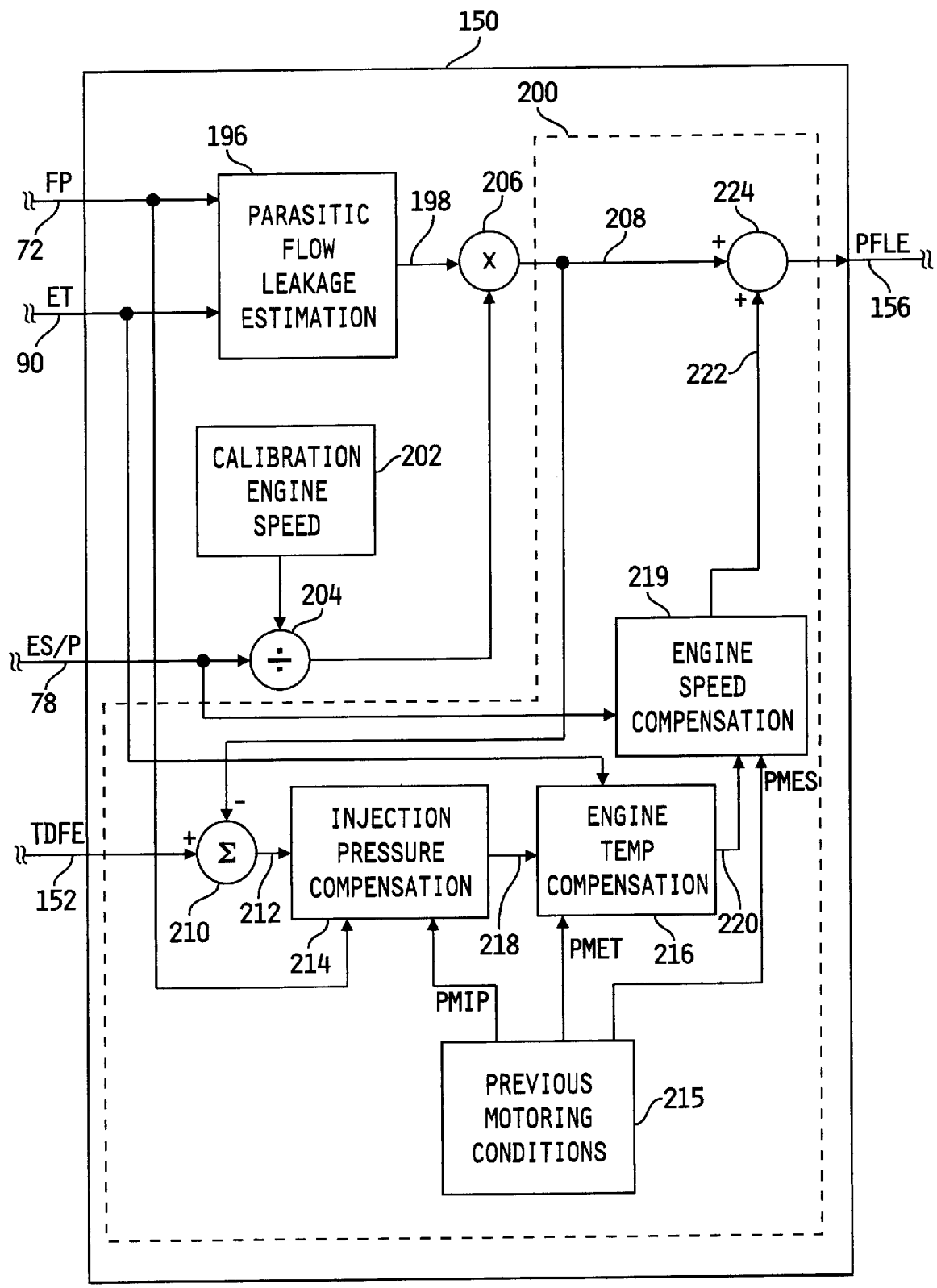
FIG. 15 is a diagrammatic illustration of one embodiment of the parasitic flow leakage estimation block of FIG. 5, in accordance with the present invention.

Referring now to FIG. 15, one preferred embodiment of the parasitic flow leakage estimate block 150 of FIG. 5, in accordance with the present invention, is shown. In many fuel systems, fuel injector 60 (FIGS. 1A and 1B) includes an intensifier (plunger or the like) as briefly described hereinabove, wherein the intensifier acts to increases fuel pressure beyond that of the fuel collection unit prior to injection. With such injectors, parasitic fuel leakages tend to occur about the intensifier area, wherein such parasitic leakage is typically a function of fuel pressure and engine or fuel temperature. Accordingly, block 150 includes a parasitic flow leakage estimation block 196 receiving the fuel pressure signal (FP) via signal path 72 and the engine temperature signal ET (e.g., fuel temperature signal or engine coolant temperature signal) via signal path 90, and producing a parasitic flow leakage estimate on output signal path 198 as a function of FP and ET. In one embodiment, block 196 is a two-dimensional look-up table having as inputs FP and ET, and producing a parasitic flow leakage estimate value as an output thereof. It is to be understood, however, that such a look-up table represents only one preferred embodiment of block 196, and that the present invention contemplates other techniques for determining the parasitic flow leakage estimate values. Examples of such other techniques include, but are not limited to equations, other tables, graphs and/or the like, wherein such equations, other tables, graphs and/or the like are intended to fall within the scope of the present invention. In one embodiment, the parasitic flow leakage estimation block 196 is defined at a specific or calibration engine speed value. In this embodiment, that calibration engine speed value is preferably stored in block 202 and provided to one input of a division node 204. Another input of division node 204 receives the engine speed/position signal (ES/P) via signal path 78 such that an output of division node 204 carries a ratio of the calibration engine speed divided by the current engine speed ES/P. This ratio is provided to one input of a multiplication node 206 having another input receiving the parasitic flow leakage estimate value on signal path 198, whereby the output of multiplication node 208 carries the parasitic flow leakage estimate value multiplied by the ratio of the calibration engine speed divided by the current engine speed. In this manner, the parasitic flow leakage estimation value on signal path 208 is adjusted by the current engine speed value ES/P. Those skilled in the art will recognize other techniques for maintaining an accurate parasitic flow leakage estimation with respect to current engine speed, and such other techniques are intended to fall within the scope of the present invention. In any case, signal path 208 is connected, in one embodiment, directly to signal path 156 such that the parasitic flow leakage estimation output of the multiplication node 206 forms the parasitic flow leakage estimation value (PFLE) provided to summing node 142 of FIG. 5.

In an alternate embodiment, the parasitic flow leakage estimate block 150 may additionally include a control structure for adjusting the parasitic flow leakage estimation value produced by multiplication node 206 based on changes in engine operating temperature, total discharged fuel estimate value TDFE and/or engine speed/position ES/P. An example of one embodiment of such a control structure is illustrated in FIG. 15 as encompassed by dashed-lined box 200, wherein the control strategy illustrated therein is operable to collect certain operating parameters during vehicle motoring conditions (i.e., final commanded fueling =zero), and adjust the parasitic flow leakage estimation value produced by block 196. In this embodiment, signal path 208 is connected to an additive input of a summing node 224 and to an subtractive input of another summing node 210. A non-inverting input of summing node 210 receives the total discharged fuel estimate value TDFE via signal path 152 and an output of node 210 provides an error signal, corresponding to the difference between TDFE and the parasitic leakage flow estimation produced at the output of multiplication node 206, to a first input of an injection pressure compensation block 214. A second input of block 214 receives the fuel pressure signal (FP) via signal path 72, and a third input of block 214 receives a previous motoring injection pressure value PMIP from a previous motoring conditions block 215, wherein block 215 is operable, in part, to collect and store the fuel pressure value (FP) from a previous vehicle motoring condition. In one embodiment, the injection pressure compensation block 214 comprises a fuel injection pressure compensation equation of the form PCOMP=1+a*(FP - PMIP), wherein a is a calibratible constant and $P_{COMP}$ is a fuel pressure compensation value output by block 214 on signal path 218. Those skilled in the art will recognize, however, that the foregoing equation may be replaced with one or more other equations, tables, graphs, or the like, and that such other equations, tables, graphs, or the like are intended to fall within the scope of the present invention. Block 214 is operable to multiply the error value on signal path 212 by the fuel pressure compensation value PCOMP and produce a first resultant error value on signal path 218.

Signal path 218 is connected to a first input of an engine temperature compensation block 216. A second input of block 216 receives the engine temperature signal ET via signal path 90, and a third input of block 216 receives a previous motoring engine temperature value PMET from the previous motoring conditions block 215, wherein block 215 is operable, in part, to collect and store the ET value from a previous vehicle motoring condition. In one embodiment, the engine temperature signals ET and PMET correspond to fuel temperatures and engine temperature compensation block 216 comprises a fuel temperature compensation equation of the form $FT_{comp}$=1+a*(ET - PMET), wherein a is a calibratible constant and FTcomp is a fuel temperature compensation value output by block 216 on signal path 220. Those skilled in the art will recognize, however, that the foregoing equation may be replaced with one or more other equations, tables, graphs, or the like, and that such other equations, tables, graphs, or the like are intended to fall within the scope of the present invention. Alternatively, block 216 may be operable to compute an engine temperature compensation value $ET_{COMP}$ and provide $ET_{COMP}$ on signal path 220, wherein ET and PMET are engine coolant temperature values. In any case, block 216 is operable to multiply the first resultant error value on signal path 218 by the fuel temperature compensation value $FT_{COMP}$ (alternatively by the engine temperature compensation value $ET_{COMP}$) to produce a second resultant error value on signal path 220.

Signal path 220 is connected to a first input of an engine speed compensation block 219. A second input of block 219 receives the engine speed/position signal ES/P via signal path 78, and a third input of block 219 receives a previous motoring engine speed value PMES from the previous motoring conditions block 215, wherein block 215 is operable, in part, to collect and store the ES value from a previous vehicle motoring condition. In one embodiment, the engine speed compensation block 219 comprises a multiplier operable to multiply the second resultant error value on signal path 220 by a ratio of ES/P and PMES, and produce as an output on signal path 222 a third resultant error value. Those skilled in the art will recognize, however, that the foregoing table may be replaced with one or more other tables, equations, graphs, or the like, and that such other tables, equations, graphs, or the like are intended to fall within the scope of the present invention, Signal path 222 is connected to a second additive input of summing node 224, wherein an output of node 224 defines signal path 156 which carries the parasitic flow leakage estimate value PFLE. In this embodiment, summing node 224 thus adds the parasitic flow leakage estimation value produced by multiplication node 206 to the third resultant error value to thereby produce an adjusted parasitic leakage flow estimation value PFLE on signal path 156. Optional block 200 is thus operable to compensate for instantaneous changes in the fuel pressure signal (FP), the engine temperature signal (ET) and the engine speed signal (ES/P) since the most recent vehicle motoring condition, and adjust the parasitic leakage flow estimation value produced by multiplication node 206 accordingly. It is to be understood that, in this embodiment, block 200 operates continuously, and that preferably summing node 210 operates, and block 215 updates, during every vehicle motoring condition.

Figure 18:
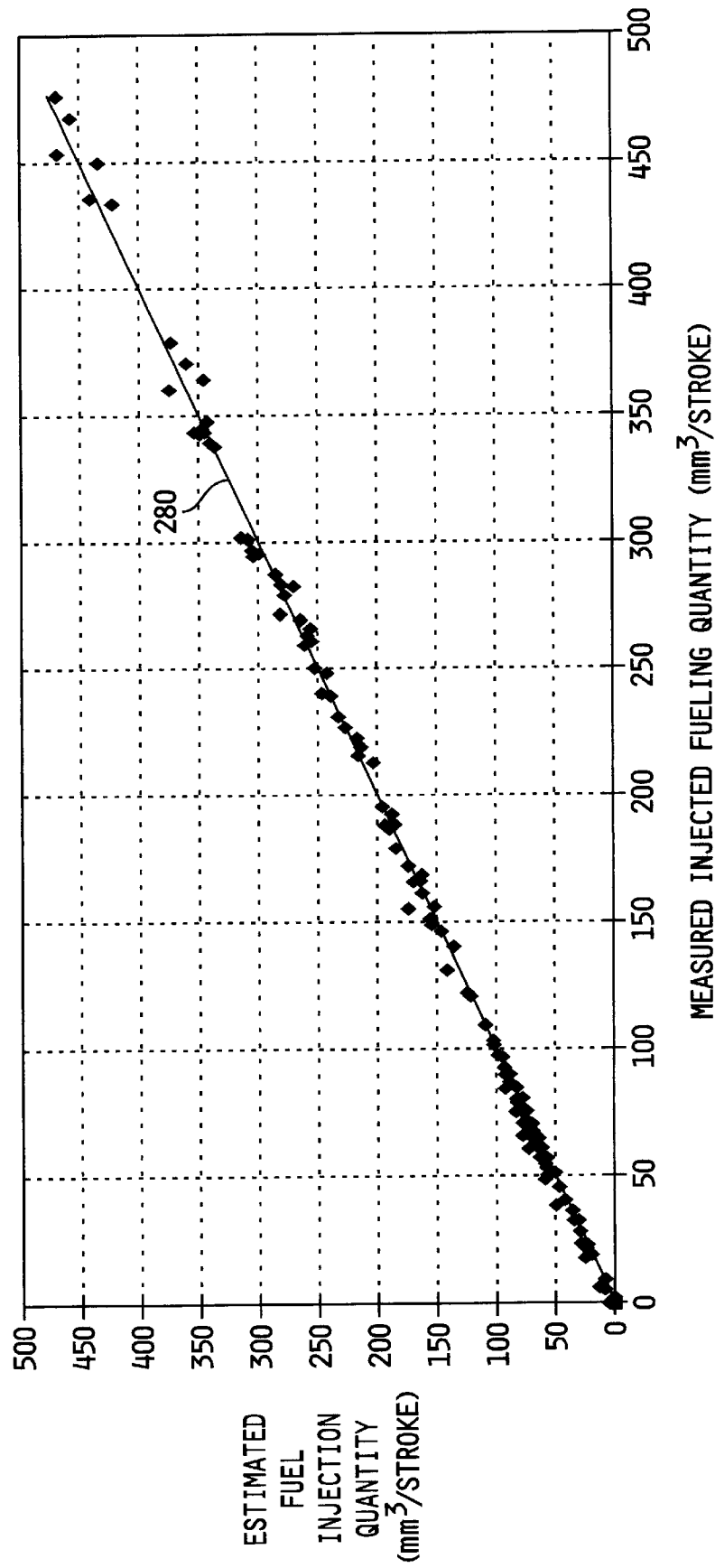
FIG. 18 is a plot of estimated fuel injection quantity vs. measured fuel injection quantity using the fuel injection control strategy of the present invention.
Figure 19:
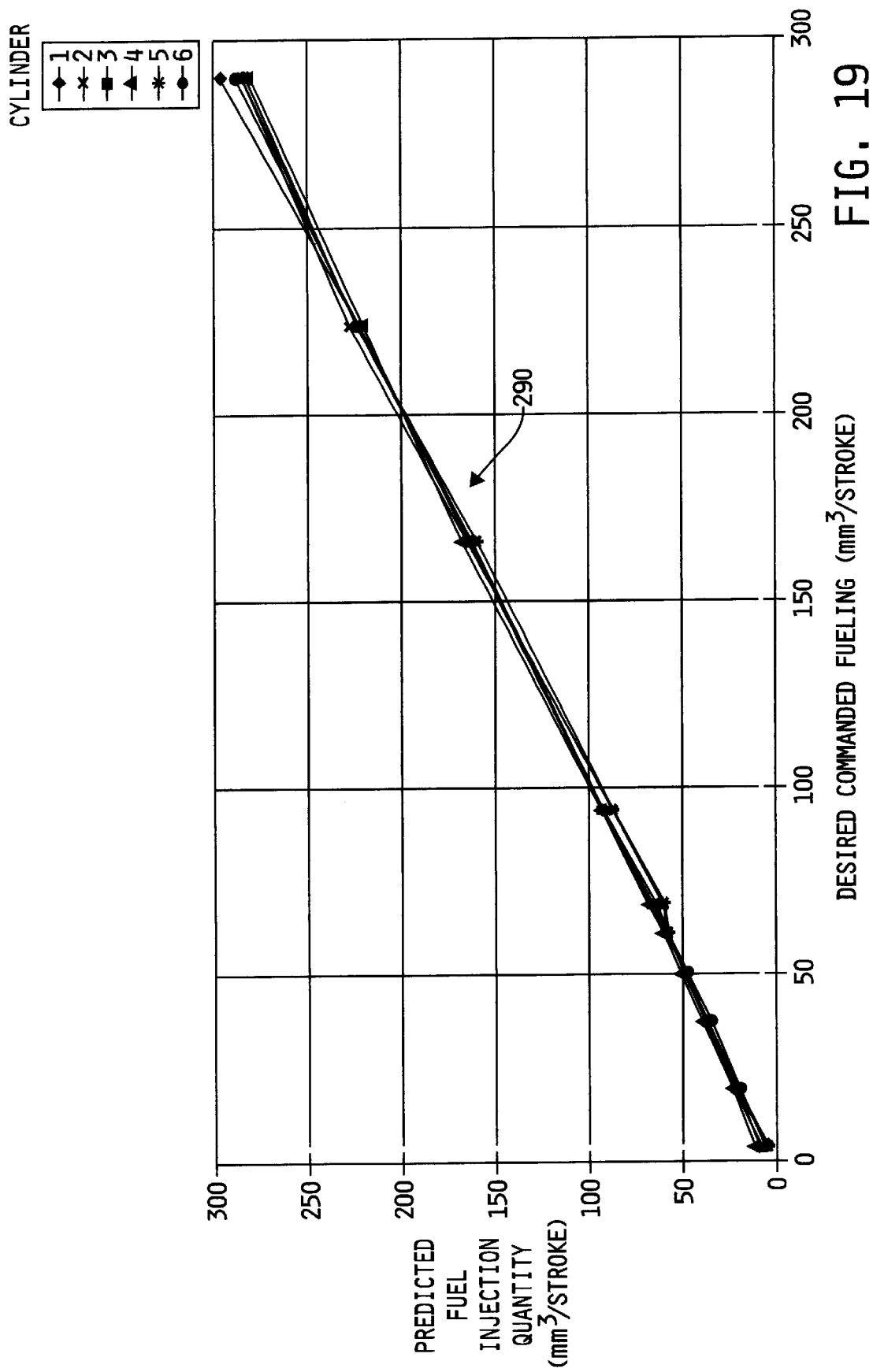
FIG. 19 is a plot of predicted fuel injection quantity vs. desired commanded fueling per cylinder using the fuel injection control strategy of the present invention.

Referring now to FIG. 18, a plot of estimated fuel injection quantity, using the control structure illustrated in FIG. 5, versus measured injected fuel quantity is shown. As is evident from the curve fitted line 280, the control strategy of the present invention for estimating injected fuel quantity tracks very closely with actual (measured) injected fuel quantities. Referring to FIG. 19, predicted fuel injection quantity is plotted against desired commanded fueling for each cylinder of a six-cylinder engine. The six tightly grouped lines 290 indicate that the within engine injected flow variability is quite low using the control concepts of the present invention.

Figure 20:
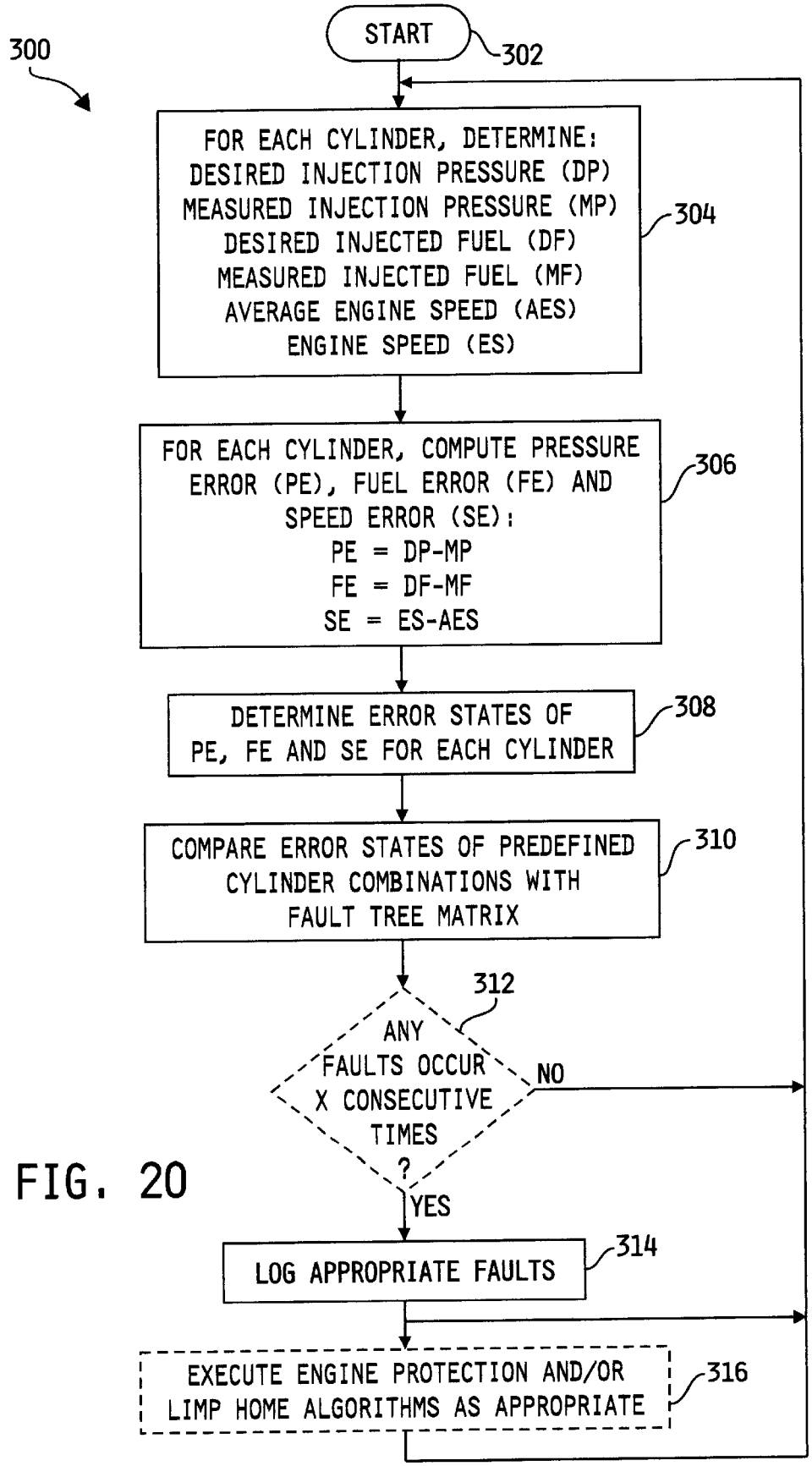
FIG. 20 is a flowchart illustrating one embodiment of a software algorithm for diagnosing operational errors in a fuel injection control system, in accordance with the present invention.

The use of a virtual sensor for estimating injected fuel quantities, such as that shown in FIGS. 4-6 and 14-15, in a system wherein the injected fueling quantity and injection pressure can be changed instantaneously, allows for component level diagnostics with very fast failure detection. Referring to FIG. 20, a software algorithm 300 is illustrated for diagnosing component level fuel system failures which is applicable to any fuel system, such as that described herein, in which accurate measurements of injected fueling and injection pressure are available (either via real or virtual measurements) and in which injection pressure and injected fuel quantity can be changed instantaneously within one firing cycle. Algorithm 300 is preferably stored within memory 75 of control circuit 68, and is preferably executed every firing cycle. Algorithm 300 starts at step 302, and at step 304 control circuit 68 is operable to determine for each cylinder a number of control parameters. For example, control circuit 68 is operable at step 304 to determine a desired injection pressure (DP) which is a value determined by control circuit 68 and used to control pump actuator 53 via signal path 74 as is known in the art. Additionally, control circuit 68 is operable at step 304 to determine a measured injection pressure (MP) which, in one embodiment, is the pressure signal provided by sensor 70, 96 or 100 and multiplied by the intensification ratio of the intensifier associated with fuel injector 60. Control circuit 68 is further operable at step 304 to determine a desired injected fuel value (DF) which is preferably the value produced by block 16 of FIG. 4. Additionally at step 304, control circuit 68 is operable to determining measured injected fuel value (MF) which, in one embodiment, is the injected fuel estimation value (IFE) produced by the fuel injection quantity estimation block 132 of FIG. 4. Alternatively, the system of FIG. 1A or 1B may include known structure for measuring injected fuel quantities wherein control circuit 68 may be operable in such an embodiment to determine MF by directly measuring injected fuel quantities. In any case, control circuit 68 is further operable at step 304 to determine an average engine speed based on the engine speed/position signal ES/P provided by engine speed/position sensor 76 on signal path 78, wherein the average engine speed (AES) is the engine speed averaged over one engine cycle. Additionally, control circuit 68 is operable at step 304 to determine an engine speed value (ES) which is preferably the engine speed determined from engine speed/position signal ES/P on signal path 78 and averaged over one firing cycle of engine 66.

Algorithm execution continues from step 304 at step 306 where the control circuit 68 is operable to determine, for each cylinder, a pressure error (PE), a fuel error (FE) and a speed error (SE). Preferably, PE is determined in step 306 as a difference between DP and MP, FE is determined as a difference between DF and MF, and SE is determined as a difference between ES and AES. Algorithm execution continues from step 306 as step 308 where control circuit 68 is operable to determine error states of the pressure error (PE), fuel error (FE) and speed error (SE) for each cylinder. Referring to FIG. 21, one embodiment of step 308 is illustrated wherein control circuit 68 is operable to determine error states as one of high, low or normal. For example, referring to the pressure error (PE), control circuit 68 is operable at step 308 to determine that the PE state is high if PE is greater than a first pressure error threshold (PE threshold 1), the PE state is low if PE is less than a second pressure error threshold (PE threshold 2), and the PE state is normal if PE is between PE threshold 1 and PE threshold 2. Error states for FE and SE are preferably determined at step 308 in a manner identical to that illustrated with respect to the pressure error state PE.

Referring again to FIG. 20, algorithm 300 continues from step 308 to step 310 where control circuit 68 is operable to compare the error states of predefined cylinder combinations with a fault tree matrix. Referring to FIG. 22, an example of step 310 is illustrated, wherein, for example, control circuit 68 is operable to compare the PE state, FE state, and SE state of cylinders 1, 2 and 3 with predetermined error states therefor to determine various faults. As shown in FIG. 22, for example, normal PE, FE and SE states for cylinders 2 and 3 while the PE state for cylinder 1 is low with the FE and SE states being high corresponds to an over-fueling fault for cylinder 1. As another example, normal/low PE states for cylinders 1, 2 and 3 and high FE states for cylinders 1, 2 and 3 while the SE state for cylinders 1 and 2 is normal with the SE state for cylinder 3 being high corresponds to a continuously over-fueling fault for cylinder 3. Those skilled in the art will recognize that other combinations of PE, FE and SE states for various cylinder combinations can be used to define other fuel system fault, and that other such fault combinations are intended to fall within the scope of the present invention.

Referring again to FIG. 20, algorithm execution continues, in one embodiment, from step 310 at step 314 where control circuit 68 is operable to log appropriate faults as defined and determined at step 310. Alternatively, algorithm 300 may include an optional step 312 wherein control circuit 68 is operable to determine whether any of the faults determined at step 310 occur some number, X, of consecutive times through algorithm 300. If not, algorithm execution continues back to step 304, and if, at step 312, control circuit 68 determines that any faults determined at step 310 have occurred X consecutive times, only then does algorithm execution continue to step 314 where appropriate faults are logged within memory 75 of control circuit 68. In either case, step 314 loops back to step 304 for repeated execution of algorithm 300. In another alternative embodiment, algorithm 300 may include optional step 316 wherein control circuit 68 is operable, after logging appropriate faults at step 314, to execute engine protection and/or limp home algorithms as appropriate and as based on the severity of faults determined at step 310. Algorithm execution loops from step 316 back to step 304 for continued execution of algorithm 300.

It should be apparent from the foregoing description that the concepts of the present invention are applicable to variously configured fuel and fuel control systems, including those having either cyclically or non-cyclically operated fuel collection units. For example, two fuel systems particularly suited for use with the present invention are disclosed in U.S. Pat. Nos. 5,676,114 and 5,819,704, which are assigned to the assignee of the present invention, and the contents of which are incorporated herein by reference.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A fuel control system for an internal combustion engine, the system comprising:
    a fuel collection unit configured to store pressurized fuel therein;
    a fuel injector configured to inject a quantity of fuel from said fuel collection unit into a combustion cylinder of an internal combustion engine;
    means for determining a first energy level associated with said fuel collection unit prior to injection of said quantity of fuel and a second energy level associated with said fuel collection unit after injection of said quantity of fuel;
    means for determining an injection pressure corresponding to a pressure of said quantity of fuel injected by said fuel injector;
    a temperature sensor producing a temperature signal corresponding to a temperature of one of said engine and said pressurized fuel; and
    a control circuit determining a first amount of fuel supplied by said fuel collection unit to said fuel injector as a function of said first and second energy levels, and determining a second amount of fuel corresponding to a portion of said first amount of fuel directed by said fuel injector back to a fuel supply as a function of said injection pressure and said temperature signal, said control circuit determining an estimate of said quantity of fuel as a difference between said first and second amounts of fuel.

2. The system of claim 1 wherein said means for determining said first and second energy levels includes a pressure sensor operable to sense fuel pressure within said fuel collection unit and produce a pressure signal corresponding thereto;
    and wherein said control circuit is operable to determine a first pressure value as a function of said pressure signal prior to injection of said quantity of fuel and a second pressure value as a function of said pressure signal after injection of said quantity of fuel, said first pressure value corresponding to said first energy level and said second pressure value corresponding to said second energy level.

3. The system of claim 2 wherein said control circuit is configured to determine said first amount of fuel as a function of a difference between said first and second pressure values.

4. The system of claim 2 further including an engine position sensor operable to determine a rotational position of said engine relative to a reference rotational position and produce an engine position signal corresponding thereto;
    and wherein said control circuit is responsive to said engine position signal to determine said first pressure value as a function of said pressure signal for a first range of engine positions prior to injection of said quantity of fuel and to determine said second pressure value as a function of said pressure signal for a second range of engine positions after injection of said quantity of fuel.

5. The system of claim 1 wherein said control circuit is configured to determine a third amount of fuel corresponding to a parasitic loss of fuel from said fuel injector, said control circuit determining said estimate of said quantity of fuel by subtracting said second and third amounts of fuel from said first amount of fuel.

6. The system of claim 1 wherein said control circuit is configured to produce an error value as a difference between a desired fuel injection value and said estimate of said quantity of fuel, to produce a fuel command adjustment value as a function of said error value and to produce a final fuel command as a function of an initial fuel command and said fuel command adjustment value;
    and wherein said fuel injector is responsive to said final fuel command to inject said quantity of fuel.

7. The system of claim 6 wherein said control circuit is configured to determine said second amount of fuel as a function of said injection pressure, said temperature signal and said final fuel command.

8. The system of claim 7 wherein said means for determining said first and second energy levels includes a pressure sensor operable to sense fuel pressure within said fuel collection unit and produce a pressure signal corresponding thereto;
    and wherein said control circuit is operable to determine a first pressure value as a function of said pressure signal prior to injection of said quantity of fuel and a second pressure value as a function of said pressure signal after injection of said quantity of fuel, said first pressure value corresponding to said first energy level and said second pressure value corresponding to said second energy level.

9. The system of claim 8 wherein said means for determining an injection pressure is responsive to said pressure signal and said final fuel command to determine said injection pressure as a function of said first and second pressure values and of said final fuel command.

10. The system of claim 1 wherein said control circuit is configured to determine said estimate of said quantity of fuel according to a regression equation, said regression equation a function of said first and second energy values.

11. The system of claim 2 wherein said control circuit is configured to determine a bulk modulus of said pressurized fuel as a function of said pressure signal and said temperature signal, said control circuit determining said first amount of fuel further as a function of said bulk modulus.

12. A fuel control system for an internal combustion engine, the system comprising:
a fuel collection unit configured to store pressurized fuel therein;
a fuel injector configured to inject a quantity of fuel from said fuel collection unit into a combustion cylinder of an internal combustion engine;
means for determining a first energy level associated with said fuel collection unit prior to injection of said quantity of fuel and a second energy level associated with said fuel collection unit after injection of said quantity of fuel;
means for determining an injection pressure corresponding to a pressure of said quantity of fuel injected by said fuel injector; and
a control circuit determining a first amount of fuel supplied by said fuel collection unit to said fuel injector as a function of said first and second energy levels, a second amount of fuel corresponding to a portion of said first amount of fuel directed by said fuel injector back to a fuel supply as a function of said injection pressure, and a parasitic fuel leakage value as a function of said first and second energy levels, said control circuit determining an estimate of said quantity of fuel by subtracting said second amount of fuel and said parasitic fuel leakage value from said first amount of fuel.

13. The system of claim 12 wherein said means for determining said first and second energy levels includes a pressure sensor operable to sense fuel pressure within said fuel collection unit and produce a pressure signal corresponding thereto;
and wherein said control circuit is operable to determine a first pressure value as a function of said pressure signal prior to injection of said quantity of fuel and a second pressure value as a function of said pressure signal after injection of said quantity of fuel, said first pressure value corresponding to said first energy level and said second pressure value corresponding to said second energy level.

14. The system of claim 13 wherein said control circuit is configured to determine said first amount of fuel as a function of a difference between said first and second pressure values.

15. The system of claim 13 further including an engine position sensor operable to determine a rotational position of said engine relative to a reference rotational position and produce an engine position signal corresponding thereto;
and wherein said control circuit is responsive to said engine position signal to determine said first pressure value as a function of said pressure signal for a first range of engine positions prior to injection of said quantity of fuel and to determine said second pressure value as a function of said pressure signal for, a second range of engine positions after injection of said quantity of fuel.

16. The system of claim 13 further including a temperature sensor producing a temperature signal corresponding to a temperature of one of said engine and said pressurized fuel;
and wherein said control circuit is configured to determine said parasitic fuel leakage value as a function of said first and second pressure values and further as a function of said temperature signal.

17. The system of claim 16 further including an engine speed sensor operable to determine a rotational speed of said engine and produce an engine speed signal corresponding thereto;
and wherein said control circuit is configured to determine said parasitic fuel leakage value as a further function of a ratio of a reference engine speed and said engine speed signal.

18. The system of claim 12 wherein said control circuit is configured to produce an error value as a difference between a desired fuel injection value and said estimate of said quantity of fuel, to produce a fuel command adjustment value as a function of said error value and to produce a final fuel command as a function of an initial fuel command and said fuel command adjustment value;
and wherein said fuel injector is responsive to said final fuel command to inject said quantity of fuel.

19. The system of claim 12 wherein said control circuit is configured to determine said estimate of said quantity of fuel according to a regression equation, said regression equation a function of said first and second energy values.

20. The system of claim 16 wherein said control circuit is configured to determine a bulk modulus of said pressurized fuel as a function of said pressure signal and said temperature signal, said control circuit determining said first amount of fuel further as a function of said bulk modulus.

21. A fuel control system for an internal combustion engine, the system comprising:
a fuel collection unit configured to store pressurized fuel therein;
a fuel injector configured to inject a quantity of fuel from said fuel collection unit into a combustion cylinder of an internal combustion engine;
a pressure sensor operable to sense pressure of said pressurized fuel within said fuel collection unit and produce a pressure signal corresponding thereto;
an engine position sensor determining a rotational position of said engine relative to a reference position and producing an engine position signal corresponding thereto; and
a control circuit responsive to said pressure signal and said engine position signal to determine a pressure change value as a difference between said pressure signal for a first engine position range prior to injection of said quantity of fuel and said pressure signal for a second engine position range after injection of said quantity of fuel, and to determine a first slope of said pressure signal within said first engine position range and a second slope of said pressure signal within said second engine position range, said control circuit determining an estimate of said quantity of fuel as a function of said pressure change value, said first slope and said second slope.

22. The system of claim 21 further including a temperature sensor producing a temperature signal corresponding to a temperature of said pressurized fuel;

and wherein said control circuit is configured to determine said first and second pressure slopes further as a function of said temperature signal.

23. The system of claim 21 wherein said control circuit is configured to produce an error value as a difference between a desired fuel injection value and said estimate of said quantity of fuel, to produce a fuel command adjustment value as a function of said error value and to produce a final fuel command as a function of an initial fuel command and said fuel command adjustment value;

and wherein said fuel injector is responsive to said final fuel command to inject said quantity of fuel.

24. The system of claim 23 wherein said control circuit is operable to determine a first amount of fuel as a function of said pressure change value, said first slope and said second slope, and to determine a second amount of fuel as a function of said pressure change value and said final fuel command, said second amount of fuel corresponding to a portion of said first amount of fuel directed by said fuel injector back to a fuel supply, said control circuit determining said estimate of said quantity of fuel by subtracting said second amount of fuel from said first amount of fuel.

25. The system of claim 24 further including a temperature sensor producing a temperature signal corresponding to a temperature of one of said engine and said pressurized fuel;

and wherein said control circuit is configured to determine a third amount of fuel as a function of said pressure change value and said temperature signal, said third amount of fuel corresponding to a parasitic leakage of a portion of said first amount of fuel from said fuel injector, said control circuit determining said estimate of said quantity of fuel by subtracting said second and third amounts of fuel from said first amount of fuel.

26. The system of claim 21 wherein said control circuit is configured to determine said estimate of said quantity of fuel according to a regression equation, said regression equation a function of said pressure signal for said first engine position range, said pressure signal for said second engine position range, said first slope and said second slope.

27. A fuel control system for an internal combustion engine, the system comprising:

a fuel collection unit configured to store pressurized fuel therein;

a fuel injector configured to inject a quantity of fuel from said fuel collection unit into a combustion cylinder of an internal combustion engine;

a pressure sensor operable to sense pressure of said pressurized fuel within said fuel collection unit and produce a pressure signal corresponding thereto; and a control circuit determining a bulk modulus of said pressurized fuel as a function of a rate of change of said pressure signal over a fuel pressure range and determining a pressure change value as a difference between said pressure signal prior to injection of said quantity of fuel and said pressure signal after injection of said quantity of fuel, said control circuit determining an estimate of said quantity of fuel as a function of said pressure change value and said bulk modulus.

28. The system of claim 27 further including a temperature sensor producing a temperature signal corresponding to a temperature of said pressurized fuel;

and wherein said control circuit is operable to determine said bulk modulus of said fuel further as a function of said temperature value.

29. The system of claim 27 wherein said control circuit is configured to produce an error value as a difference between a desired fuel injection value and said estimate of said quantity of fuel, to produce a fuel command adjustment value as a function of said error value and to produce a final fuel command as a function of an initial fuel command and said fuel command adjustment value;

and wherein said fuel injector is responsive to said final fuel command to inject said quantity of fuel.

30. The system of claim 29 wherein said control circuit is operable to determine a first amount of fuel as a function of said pressure change value and to determine a second amount of fuel as a function of said pressure change value and said final fuel command, said second amount of fuel corresponding to a portion of said first amount of fuel directed by said fuel injector back to a fuel supply, said control circuit determining said estimate of said quantity of fuel by subtracting said second amount of fuel from said first amount of fuel.

31. The system of claim 30 further including a temperature sensor producing a temperature signal corresponding to a temperature of one of said engine and said pressurized fuel;

and wherein said control circuit is configured to determine a third amount of fuel as a function of said pressure change value and said temperature signal, said third amount of fuel corresponding to a parasitic leakage of a portion of said first amount of fuel from said fuel injector, said control circuit determining said estimate of said quantity of fuel by subtracting said second and third amounts of fuel from said first amount of fuel.

32. The system of claim 27 wherein said control circuit is configured to determine said estimate of said quantity of fuel according to a regression equation, said regression equation a function of said pressure signal prior to injection of said quantity of fuel and said pressure signal after injection of said quantity of fuel.

* * * * *

UNITED STATES PATENT AND TRADEMARK OFFICE
CERTIFICATE OF CORRECTION

PATENT NO. : 6,557,530 B1 Page 1 of 1
DATED : May 6, 2003
INVENTOR(S) : Donald J. Benson et al.

It is certified that error appears in the above-identified patent and that said Letters Patent is hereby corrected as shown below:

Column 10,
Line 56, please delete "circuit." and insert -- circuit --.

Column 13,
Line 13, please delete "(EP)" and insert -- (FP) --.

Column 14,
Line 60, please delete "B" and insert -- β --.

Column 16,
Line 40, please delete "$FP_{PRE}^{I}$" and insert -- $FP_{PREi}$ --.
Line 41, please delete "$FP_{POST}^{I}$" and insert -- $FP_{POSTi}$ --.

Column 19,
Line 16, please delete "calling 10 routine" and insert -- calling routine --.

Column 20,
Line 4, please delete "commanded 30 fueling" and insert -- commanded fueling --.

Column 22,
Lines 40 and 49, please delete "PCOMP" and insert -- $P_{COMP}$ --.
Line 62, please delete "$FT_{comp}$" and insert -- $FT_{COMP}$ --.
Line 63, please delete "$FT_{comp}$" and insert -- $FT_{COMP}$ --.

Column 28,
Line 8, please delete "for, a" and insert -- for a --.

Signed and Sealed this

Thirtieth Day of September, 2003

JAMES E. ROGAN
*Director of the United States Patent and Trademark Office*